US 8,130,624 B2

(12) United States Patent
Nakata et al.

(10) Patent No.: US 8,130,624 B2
(45) Date of Patent: Mar. 6, 2012

(54) OPTICAL HEAD DEVICE FOR FORMING LIGHT SPOT ON DISC-SHAPED INFORMATION MEDIUM

(75) Inventors: Hideki Nakata, Kyoto (JP); Hideki Aikoh, Osaka (JP)

(73) Assignee: Panasonic Corporation, Osaka (JP)

( * ) Notice: Subject to any disclaimer, the term of this patent is extended or adjusted under 35 U.S.C. 154(b) by 888 days.

(21) Appl. No.: 12/088,555

(22) PCT Filed: Oct. 2, 2006

(86) PCT No.: PCT/JP2006/319701
§ 371 (c)(1),
(2), (4) Date: Jul. 7, 2008

(87) PCT Pub. No.: WO2007/037479
PCT Pub. Date: Apr. 5, 2007

(65) Prior Publication Data
US 2009/0201789 A1     Aug. 13, 2009

(30) Foreign Application Priority Data
Sep. 30, 2005   (JP) ................................ 2005-288109

(51) Int. Cl.
*G11B 7/135* (2006.01)

(52) U.S. Cl. ......... 369/112.24; 369/112.28; 369/112.29; 369/44.11

(58) Field of Classification Search .................. None
See application file for complete search history.

(56) References Cited

U.S. PATENT DOCUMENTS

| 5,745,466 | A | 4/1998 | Kasahara | |
| 7,113,459 | B2 * | 9/2006 | Odajima et al. | 369/44.23 |
| 2005/0249097 | A1 | 11/2005 | Hashimura et al. | |
| 2009/0201789 | A1 * | 8/2009 | Nakata et al. | 369/112.24 |

FOREIGN PATENT DOCUMENTS

| JP | 09017005 | * | 1/1997 |
| JP | 9-120559 | | 5/1997 |
| JP | 9-120561 | | 5/1997 |

(Continued)

OTHER PUBLICATIONS

International Search Report issued Nov. 7, 2006 in the International (PCT) Application of which the present application is the U.S. National Stage.

*Primary Examiner* — Joseph Haley
*Assistant Examiner* — Ifedayo Iluyomade
(74) *Attorney, Agent, or Firm* — Wenderoth, Lind & Ponack, L.L.P.

(57) ABSTRACT

An optical head device has at least one upward-reflecting mirror, objective lenses, an objective lens actuator, and a moving mechanism. The upward-reflecting mirror receives an incident luminous flux having a wavelength emitted from a semiconductor, and changes its direction. The objective lenses having mutually different numerical apertures condense the luminous flux whose direction has been changed by the upward-reflecting mirror to radiate a condensed luminous flux onto an information recording medium. The objective lens actuator moves the objective lenses in the focus direction of the information recording medium so that the luminous flux incident on the information recording medium attains a focused state. The moving mechanism moves the upward-reflecting mirror so that the luminous flux is incident on the information recording medium via any one of the objective lenses.

1 Claim, 22 Drawing Sheets

FOREIGN PATENT DOCUMENTS

| | | | |
|---|---|---|---|
| JP | 09120559 | * | 5/1997 |
| JP | 9-198704 | | 7/1997 |
| JP | 9-265634 | | 10/1997 |
| JP | 09265634 | * | 10/1997 |
| JP | 9-017005 | | 11/1997 |
| JP | 11-120587 | | 4/1999 |
| JP | 2005-353261 | | 12/2005 |

* cited by examiner

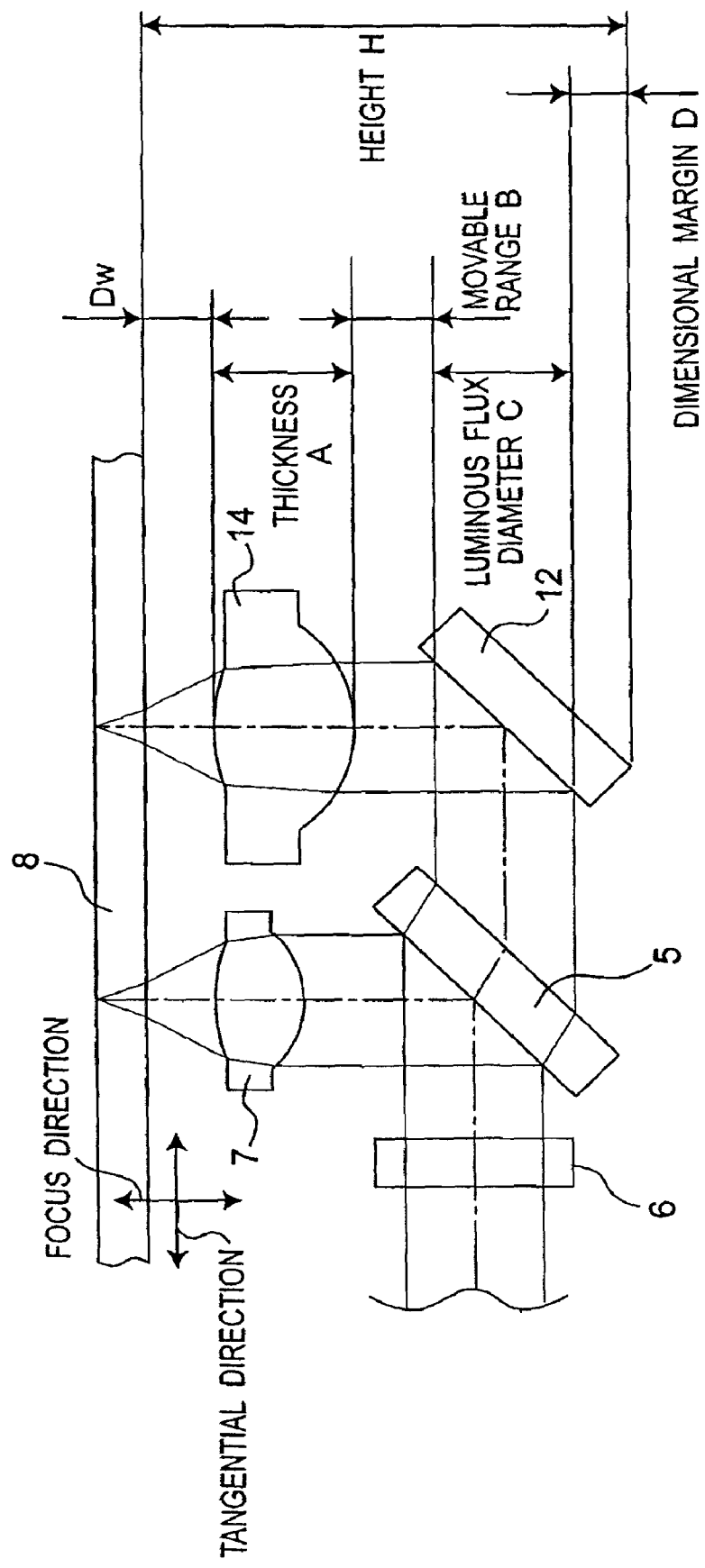
Fig. 26 - PRIOR ART

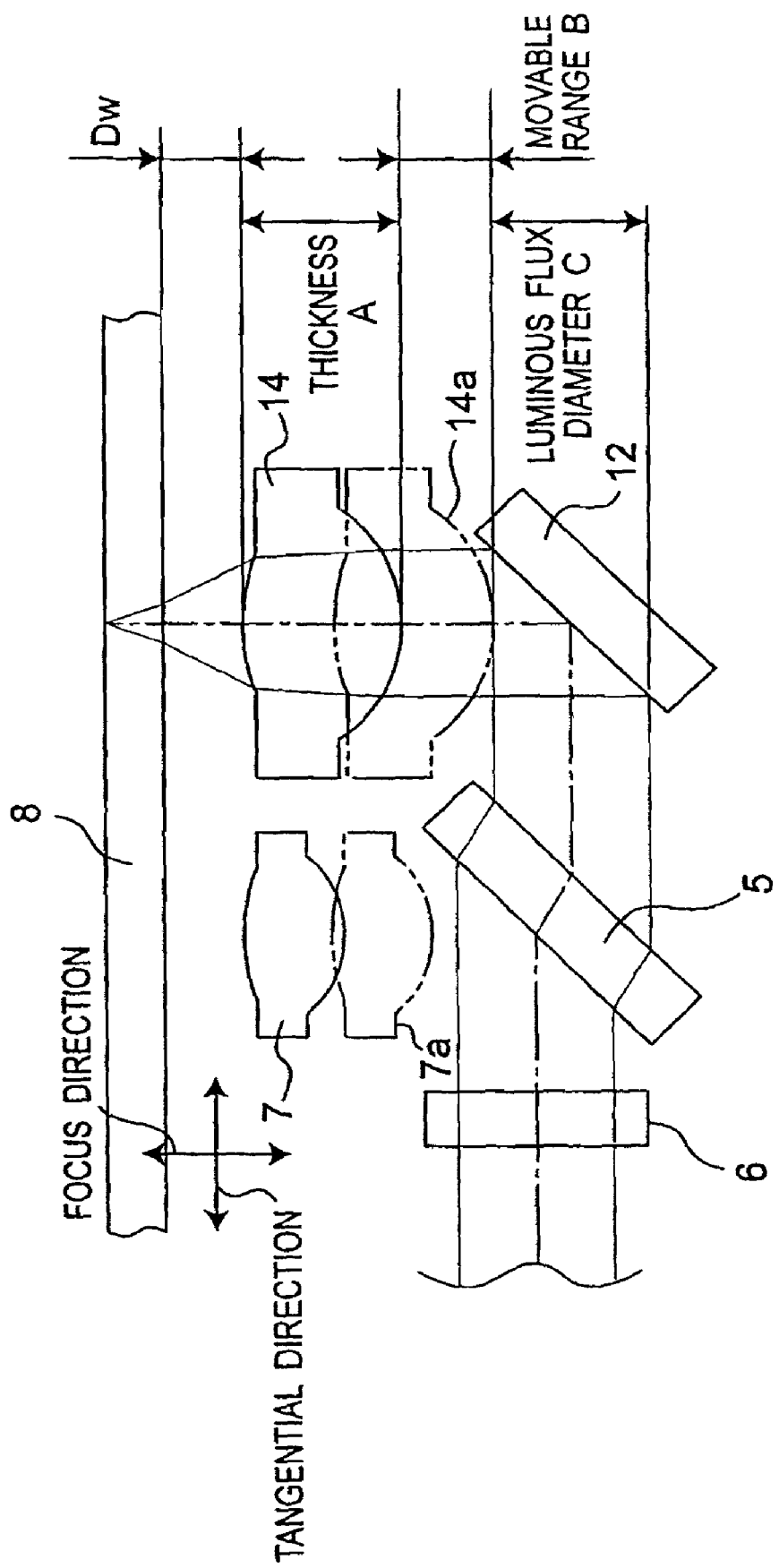
Fig.27 – PRIOR ART

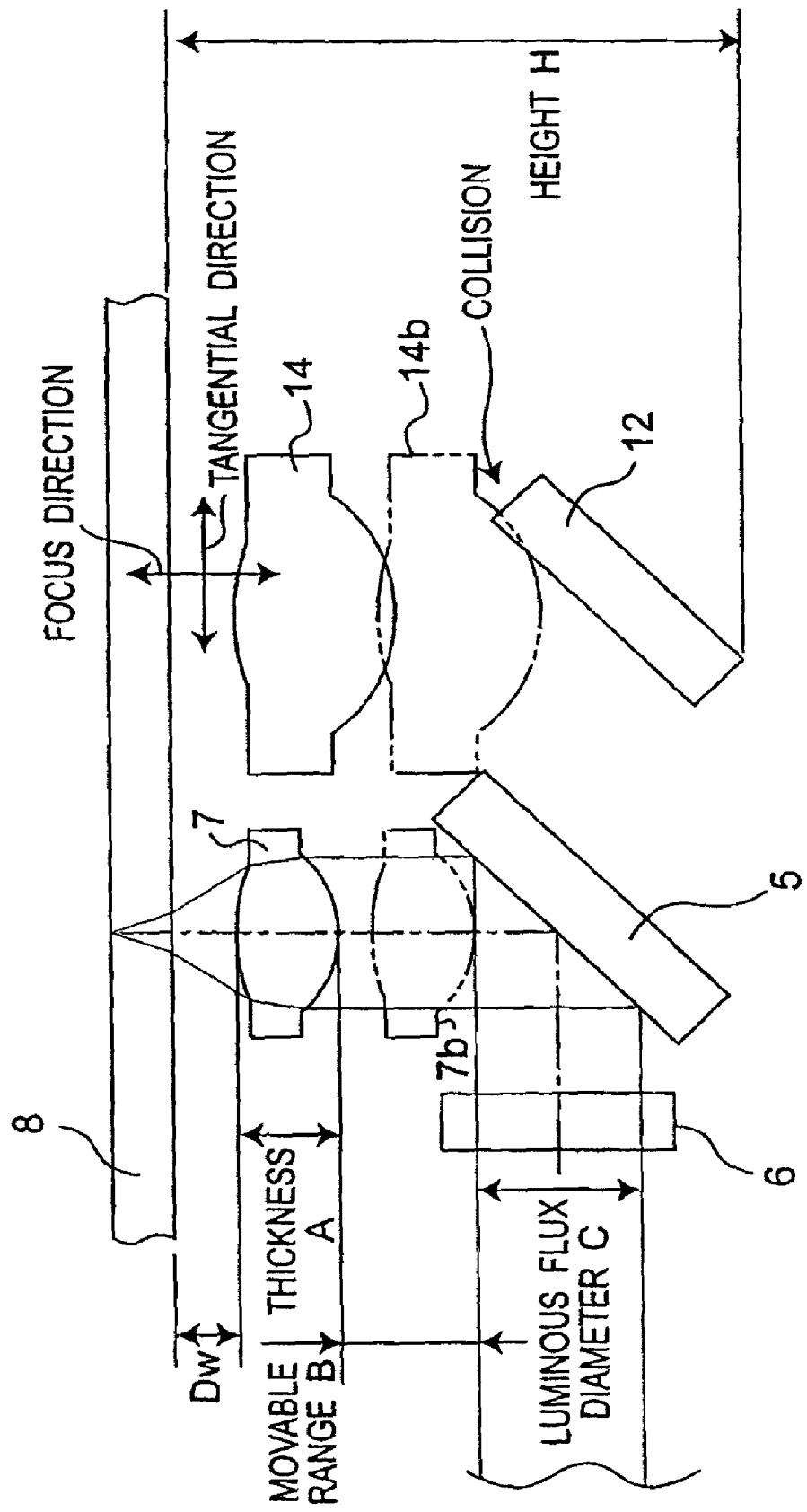
Fig. 28 - PRIOR ART

OPTICAL HEAD DEVICE FOR FORMING LIGHT SPOT ON DISC-SHAPED INFORMATION MEDIUM

TECHNICAL FIELD

The present invention relates to an optical head device for forming a light spot on a disc-shaped information recording medium for recording information on the information recording medium or for reproducing information from the information recording medium and to a disc recording apparatus, a disc reproducing apparatus and a disc recording and reproducing apparatus each provided with the same optical device.

BACKGROUND ART

In recent years, disc recording and reproducing apparatuses have been compatible with a variety of recording media including those for DVD (Digital Versatile Disc), BD (Blue-ray Disc), CD (Compact Disc), personal computers and so on and have the applications thereof diversified year by year. In addition, in accordance with demands for increasing the densities of the recording media, the disc recording and reproducing apparatuses are demanded to have high performances and high recording densities. In particular, disc recording and reproducing apparatuses for laptop type personal computers and mobile uses are also eagerly demanded to have reductions in size and thickness.

FIG. 26 is a schematic view of an optical system showing an essential part of an optical head device of a prior art. The optical head device of the prior art has objective lenses 7 and 14 that condense laser lights of different wavelengths emitted from light sources, and radiate the lights to an information recording medium 8, and upward-reflecting mirrors 5 and 12 for reflecting the laser lights to change their directions. Referring to FIG. 26, it is assumed that the thickness of the objective lenses 7 and 14 is A, the movable range of the objective lenses 7 and 14 is B, the luminous flux diameter of the laser light incident on the upward-reflecting mirrors 5 and 12 is C, dimensional margins in consideration for the chipped edge's, non-uniform deposition of reflection coatings and so on of the upward-reflecting mirrors 5 and 12 is D, a distance (working distance) from the objective lenses 7 and 14 to the information recording medium 8 is Dw, the total height of the optical head device is H, the numerical aperture of the objective lenses is NA, and the focal distance is f. In this case, the luminous flux diameter C is expressed by the following Equation (1), and the total height H of the optical head device is expressed by the following Equation (2):

$$C = 2 \times NA \times f \quad (1); \text{ and}$$

$$H = A + B + C + D + Dw \quad (2).$$

FIG. 27 is a schematic view of an optical system showing an essential part of the optical head device in a case where laser light having a wavelength of 405 nm is used in the optical head device shown in FIG. 26. Referring to FIG. 27, the laser light having a wavelength of 405 nm emitted from a light source is transformed from a linearly polarized light into a circularly polarized light by a quarter-wave plate 6 and made incident on the upward-reflecting mirror 5. The upward-reflecting mirror 5 transmits the laser light having a wavelength of 405 nm. The laser light that has been transmitted through the upward-reflecting mirror 5 is made incident on the upward-reflecting mirror 12 and reflected by the upward-reflecting mirror 12. The laser light reflected by the upward-reflecting mirror 12 is condensed by the objective lens 14, and this leads to formation of a light spot on the information recording medium 8. At this time, the objective lens 14 moves to a position 14a at maximum in a focus direction within a movable range B in order to follow the surface sway of the information recording medium 8, and the objective lens 7 moves to a position 7a at maximum interlockingly with the objective lens 14.

FIG. 28 is a schematic view of an optical system showing an essential part of the optical head device in a case where laser light having a wavelength of 650 nm is used in the optical head device shown in FIG. 26. Referring to FIG. 28, the laser light having a wavelength of 650 nm emitted from a light source is transformed from a linearly polarized light into a circularly polarized light by the quarter-wave plate 6 and reflected by the upward-reflecting mirror 5. The laser light reflected by the upward-reflecting mirror 5 is condensed by the objective lens 7, and this leads to formation of a light spot on the information recording medium 8. At this time, the objective lens 7 moves to a position 7b at maximum in the focus direction within the movable range B in order to follow the surface sway of the information recording medium 8, and the objective lens 14 moves to a position 14b at maximum interlockingly with the objective lens 7.

See Patent Document 1: JP-11-120587-A.

However, since the objective lenses 7 and 14 interlockingly move in the optical head device of the prior art when the objective lenses 7 and 14 have mutually different thicknesses, there is a possibility that the upward-reflecting mirror 12 and the objective lens 14 collide with each other when the objective lens 7 moves in the focus direction as shown in FIG. 28. The collision possibly occurs similarly when the objective lenses 7 and 14 have different working distances Dw or when the placement position of one of the objective lenses 7 and 14 is located on the side lower than the other one. Accordingly, there has been such a problem that the height H of the optical head device has needed to be increased in order to avoid the collision, and it has been difficult to reduce the size and thickness of the optical head device.

An object of the present invention is to solve the above problems and to provide a compact thin optical head device as well as a disc recording apparatus, a disc reproducing apparatus and a disc recording and reproducing apparatus each provided with the same optical device.

SUMMARY OF THE INVENTION

According to the first aspect of the present invention, there is provided an optical head device including at least one luminous direction changing means, a plurality of objective lenses, and first and second moving means. The luminous flux direction changing means receives an incident luminous flux having a predetermined wavelength emitted from a light source, and changes a direction thereof. The plurality of objective lenses each has mutually different numerical apertures, and each of the objective lenses condenses the luminous flux whose direction has been changed by the luminous flux direction changing means, and radiates a condensed luminous flux onto an information recording medium. The first moving means moves the objective lens in a focus direction of the information recording medium so that the luminous flux incident on the information recording medium attains a focused state. The second moving means moves the luminous flux direction changing means so that the luminous flux is incident on the information recording medium via any one of the plurality of objective lenses.

In the above-mentioned optical head device, the at least one luminous flux direction changing means may include a surface reflection type mirror having a surface reflectance at a wavelength of the incident luminous flux. Alternatively, the at least one luminous flux direction changing means may include a prism having a luminous flux incidence surface that transmits the incident luminous flux, and an inner surface reflector that changes a direction of the transmitted luminous flux. Further, alternatively, the at least one luminous flux direction changing means may include a prism having a surface reflection type mirror having a surface reflectance at a wavelength of the incident luminous flux, a luminous flux incidence surface that transmits the incident luminous flux, and an inner surface reflector that changes a direction of the transmitted luminous flux.

In addition, the above-mentioned optical head device may include a plurality of the luminous flux direction changing means, and a retention member. The retention member may retain the plurality of luminous flux direction changing means at a predetermined mutual interval so that at least one of the plurality of luminous flux direction changing means is provided at a position to oppose the corresponding objective lens, and at least another one of the plurality of luminous flux direction changing means is provided offset at a position in which it does not oppose the corresponding objective lens. The second moving means may move the luminous flux direction changing means by moving the retention member linearly or in a plurality of dimensions so that at least one of the plurality of luminous flux direction changing means opposes the corresponding objective lens.

Further, the above-mentioned optical head device may include a plurality of the luminous flux direction changing means. The second moving means may pivotally move the luminous flux direction changing means so that at least one of the plurality of luminous flux direction changing means opposes the corresponding objective lens.

Still further, in the above-mentioned optical head device, the plurality of objective lenses may be arranged in a radial direction of the information recording medium, and the second moving means may move the luminous flux direction changing means in the radial direction.

In addition, in the above-mentioned optical head device, the plurality of objective lenses may be arranged in a tangential direction of the information recording medium, and the second moving means may move the luminous flux direction changing means in the tangential direction.

Further, in the above-mentioned optical head device, the second moving means may include a lock mechanism which fixes the luminous flux direction changing means at a predetermined position.

Still further, in the above-mentioned optical head device, the second moving means may include any one of a piezoelectric device, a stepping motor, a DC motor, and an ultrasonic motor.

In addition, in the above-mentioned optical head device, the second moving means may move the luminous flux direction changing means stepwise or steplessly.

According to the second aspect of the present invention, there is provided a disc recording apparatus for recording an information signal on a disc-shaped information recording medium by means of a luminous flux, where the disc recording apparatus includes the above-mentioned optical head device.

According to the third aspect of the present invention, there is provided a disc reproducing apparatus for reproducing an information signal from a disc-shaped information recording medium by means of a luminous flux, where the disc reproducing apparatus includes the above-mentioned optical head device.

According to the fourth aspect of the present invention, there is provided a disc recording and reproducing apparatus for recording an information signal on a disc-shaped information recording medium by means of a luminous flux and reproducing an information signal from the information recording medium by means of a luminous flux, where the disc recording and reproducing apparatus includes the above-mentioned optical head device.

According to the optical head device of the present invention, which has the second moving means that moves the luminous flux direction changing means, a compact thin optical head device that is able to prevent the collision of the objective lens with the luminous flux direction changing means without increasing the height of the optical head device can therefore be provided.

In addition, by including the luminous flux direction changing means including the surface reflection type mirror that has a surface reflectance at the wavelength of the incident luminous flux, a compact thin optical head device can be provided at low cost.

Further, by including the luminous flux direction changing means including the luminous flux incidence surface that transmits the incident luminous flux and the prism that has the inner surface reflector that changes the direction of the transmitted luminous flux, a more compact thin optical head device that is able to reduce the luminous flux diameter and the inclination of the luminous flux direction changing means can be provided.

Still further, by including the luminous flux direction changing means including the surface reflection type mirror and the prism, a compact thin optical head device can be provided.

In addition, with at least one luminous flux direction changing means provided offset in the configuration that has the plurality of luminous flux direction changing means, a compact thin optical head device that is able to prevent the collision of the objective lens with the luminous flux direction changing means without increasing the height of the optical head device can be provided.

Further, by including the second moving means pivotally moving the facing luminous flux direction changing means so that at least one of the plurality of luminous flux direction changing means opposes the corresponding objective lens in the configuration that has the plurality of luminous flux direction changing means, a compact thin optical head device that prevents the collision of the objective lens with the luminous flux direction changing means without increasing the height of the optical head device can be provided.

Still further, by including the plurality of objective lenses arranged in the tangential direction, or the radial direction and the second moving means moving the luminous flux direction changing means in the tangential direction or the radial direction, an optical head device that is compact and thin in the radial direction or the tangential direction can be provided.

In addition, by including the second moving means having the lock mechanism, an optical head device that is able to accurately fix the position of the luminous flux direction changing means and resistant to vibrations can be provided.

Further, by including the second moving means moving the luminous flux direction changing means stepwise or steplessly, the luminous flux direction changing means can be placed at an optimal position, and a compact high-performance optical head device that is able to reduce the size of the eclipse of the luminous flux due to the luminous flux direction changing means can be provided.

In addition, a disc recording apparatus, a disc reproducing apparatus and a disc recording and reproducing apparatus, which produce effects similar to those of the optical head device, can be provided.

BRIEF DESCRIPTION OF DRAWINGS

FIG. 26 is a schematic view of an optical system showing an essential part of an optical head device according to a prior art;

FIG. 27 is a schematic view of an optical system showing an essential part of the optical head device according to the prior art in a case where laser light having a wavelength of 405 nm is used; and FIG. 28 is a schematic view of an optical system showing an essential part of the optical head device according to the prior art in a case where laser light having a wavelength of 650 nm is used.

DETAILED DESCRIPTION OF THE INVENTION

Figure 1:
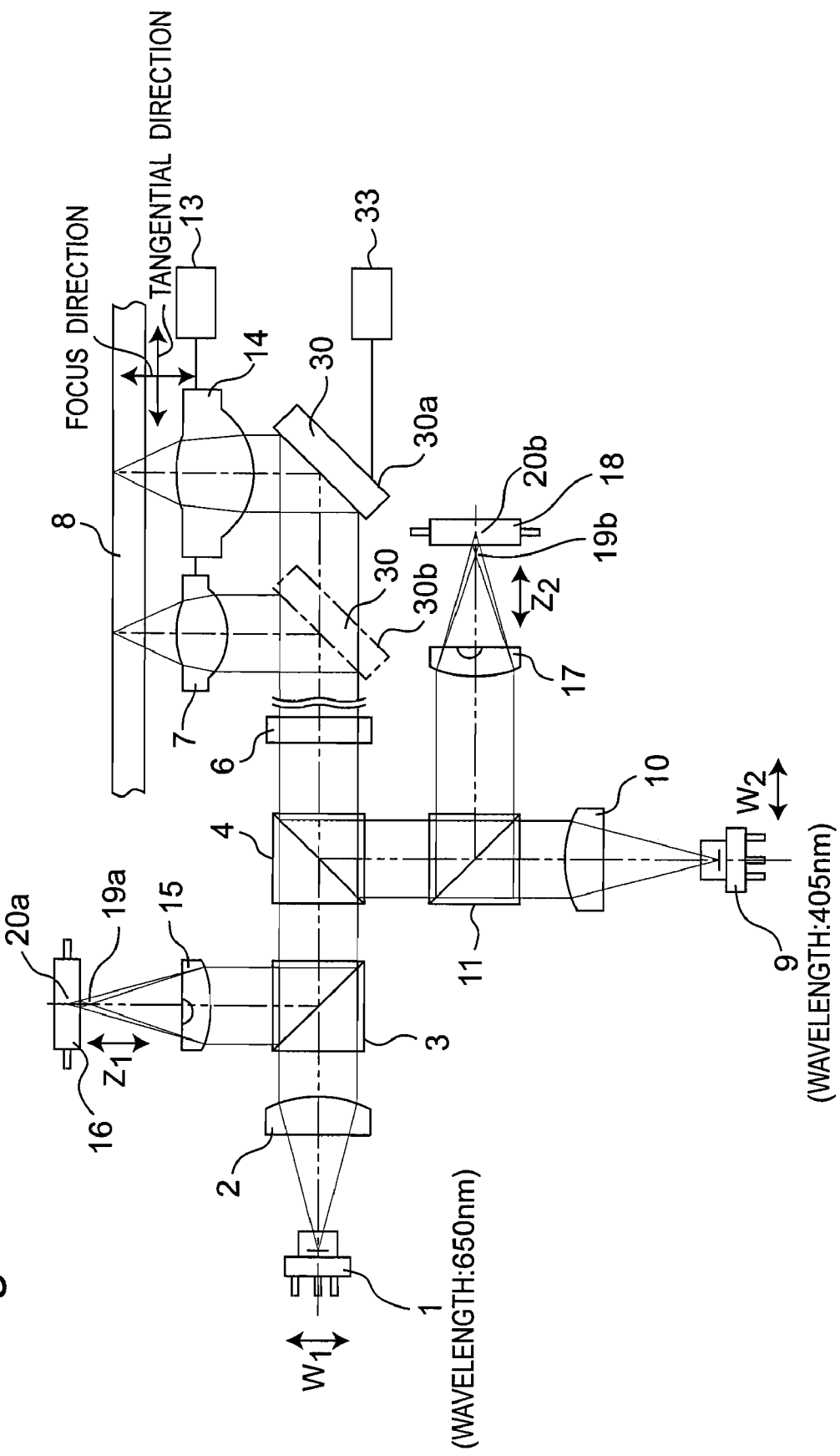
FIG. 1 is a schematic view of an optical system showing an optical head device according to a first preferred embodiment of the present invention.

Preferred embodiments according to the present invention will be described below with reference to the drawings. In each of the following preferred embodiments, similar components are denoted by the same reference numerals.

First Preferred Embodiment

FIG. 1 is a schematic view of an optical system showing an optical head device according to the first preferred embodiment. The optical head device according to the present preferred embodiment is mounted in a disc recording and reproducing apparatus that records an information signal on a disc-shaped information recording medium 8 of, for example, a DVD (Digital Versatile Disc), BD (Blue-ray Disc) or the like by means of a luminous flux and reproduces an information signal from the information recording medium 8 by means of a luminous flux. Referring to FIG. 1, the optical head device of the present preferred embodiment is constituted of semiconductor lasers 1 and 9, collimating lenses 2 and 10, polarization beam splitters 3 and 11, a wavelength-selecting prism 4, a quarter-wave plate 6, an upward-reflecting mirror 30, an objective lens 7 for a wavelength of 650 nm, an objective lens 14 for a wavelength of 405 nm, an objective lens actuator 13 that moves the objective lenses 7 and 14 in the focus direction, detection lenses 15 and 17, photo-detectors 16 and 18, and a moving mechanism 33 that moves the upward-reflecting mirror 30. The semiconductor laser 1 outputs laser light having a wavelength of 650 nm for reading, for example, a DVD or the like, and the semiconductor laser 9 outputs laser light having a wavelength of 405 nm for reading, for example, a BD or the like. In the present preferred embodiment, it is assumed that the numerical aperture (NA: Numerical Aperture) of the objective lens 14 is larger than the numerical aperture of the objective lens 7 and that the thickness of the objective lens 14 is larger than the thickness of the objective lens 7.

Figure 2:
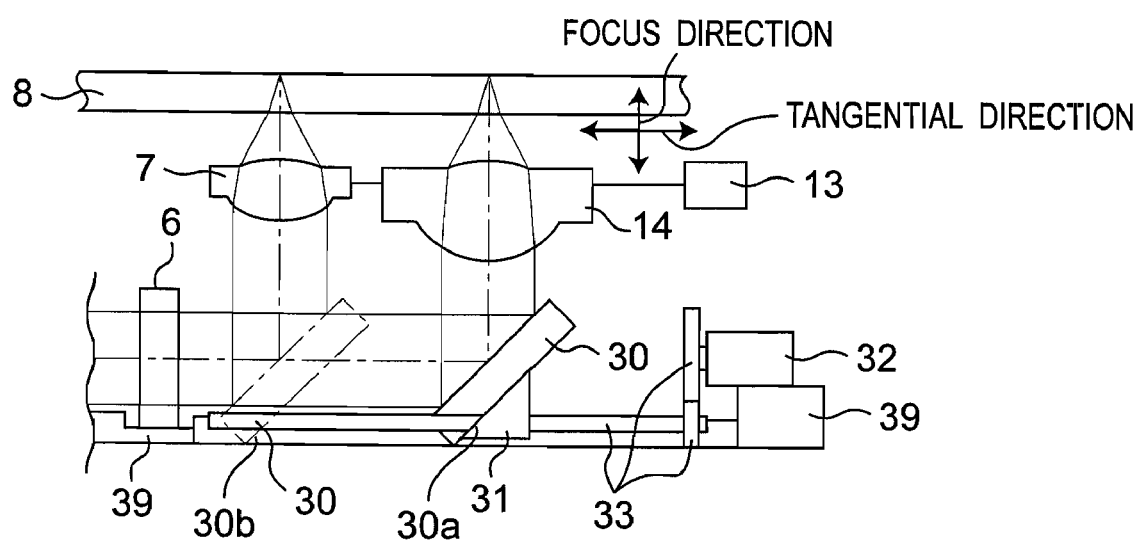
FIG. 2 is a schematic view of an optical system showing an essential part of the optical head device according to the first preferred embodiment of the present invention.

FIG. 2 is a schematic view of an optical system showing an essential part of the optical head device of the present preferred embodiment. Referring to FIG. 2, the upward-reflecting mirror 30 is retained by a retention member 31, and the retention member 31 is moved in the tangential direction by the moving mechanism 33 that employs a driving force 32 of, for example, a stepping motor, a DC motor, an ultrasonic motor or the like.

Referring to FIGS. 1 and 2, when the disc recording and reproducing apparatus recognizes that the inserted information recording medium 8 is, for example, a BD, the upward-reflecting mirror 30 is moved by the moving mechanism 33 to a position 30a to oppose the objective lens 14, and thereafter, the semiconductor laser 9 emits laser light having a wavelength of 405 nm. The divergent pencil of rays of the wavelength of 405 nm emitted from the semiconductor laser 9 is transformed into a parallel luminous flux by the collimating lens 10 and made incident on the polarization beam splitter 11. The polarization beam splitter 11 substantially wholly transmits a polarized light (p-polarized light) component in the direction of arrow W2 of FIG. 1 and substantially wholly reflects a polarized light (s-polarized light) component in a direction perpendicular to the sheet plane. The luminous flux that has passed through the polarization beam splitter 11 is made incident on the wavelength-selecting prism 4. Since the wavelength-selecting prism 4 substantially reflects all the luminous fluxes having wavelengths other than 650 nm, the luminous flux having a wavelength of 405 nm is substantially wholly reflected by the wavelength-selecting prism 4 and made incident on the quarter-wave plate 6. The quarter-wave plate 6 makes the light incident by transforming the linearly polarized light into the circularly polarized light. The luminous flux transformed by the quarter-wave plate 6 is reflected by the upward-reflecting mirror 30 and thereafter condensed by the objective lens 14, consequently radiating a light spot to the information recording medium 8. The luminous flux reflected by the information recording medium 8 is retransmitted through the objective lens 14, is reflected by the upward-reflecting mirror 30, and is made incident on the quarter-wave plate 6. The luminous flux incident on the quarter-wave plate 6 is transformed from the circularly polarized light into the linearly polarized light, is reflected by the wavelength-selecting prism 4, is reflected by the polarization beam splitter 11, is made incident on the detection lens 17, and is detected by the photo-detector 18. The detection lens 17 has an incidence surface of a convex lens to produce the effect of an astigmatism system that is one of the detection systems of the so-called focus servo and an emission plane of a cylindrical lens similar to the detection lens 15.

On the other hand, when the disc recording and reproducing apparatus recognizes that the inserted information recording medium 8 is, for example, a DVD, the upward-reflecting mirror 30 is moved by the moving mechanism 33 to a position 30b to oppose the objective lens 7, and thereafter, the semiconductor laser 1 emits laser light having a wavelength of 650 nm. The divergent pencil of rays of the wavelength of 650 nm emitted from the semiconductor laser 1 is transformed into a parallel luminous flux by the collimating lens 2 and made incident on the polarization beam splitter 3. The polarization beam splitter 3 substantially wholly transmits a polarized light (p-polarized light) component in the direction of arrow W1 of FIG. 1 and substantially wholly reflects a polarized light (s-polarized light) component in the direction perpendicular to the sheet plane. The luminous flux that has passed through the polarization beam splitter 3 is made incident on the wavelength-selecting prism 4. The wavelength-selecting prism 4 substantially wholly transmits the luminous flux having a wavelength of 650 nm and reflects substantially all the luminous fluxes having the other wavelengths. The luminous flux that has passed through the wavelength-selecting prism 4 is made incident on the quarter-wave plate 6. The quarter-wave plate 6 makes the light incident by transforming the linearly polarized light into the circularly polarized light. The luminous flux transformed by the quarter-wave plate 6 is reflected by the upward-reflecting mirror 30 and thereafter condensed by the objective lens 7, consequently radiating a light spot to the information recording medium 8. The luminous flux reflected by the information recording medium 8 is retransmitted through the objective lens 7, is reflected by the upward-reflecting mirror 30, and is made incident on the quarter-wave plate 6. The luminous flux incident on the quarter-wave plate 6 is transformed from the circularly polarized light into the linearly polarized light. The luminous flux having a wavelength of 650 nm emitted from the semiconductor laser 1 is transmitted through the wavelength-selecting prism 4, is reflected by the polarization beam splitter 3, is made incident on the detection lens 15, and is detected by the photo-detector 16. In order to produce the effect of the astigmatism system that is one of the detection systems of the so-called focus servo, the incidence surface of the detection lens 15 is formed into a convex lens, and the emission plane of the detection lens 15 is formed into a concave lens.

It is noted that the upward-reflecting mirror 30 has a surface reflectance capable of reflecting at least the luminous fluxes having the wavelength of 650 nm and the wavelength of 405 nm. In addition, the initial position (position immediately after the startup of the optical head device or when neither one of the objective lenses 7 and 14 is used) of the upward-reflecting mirror 30 should preferably be located at the middle between a position just below the objective lens 7 and a position just below the objective lens 14 so as to move to the desired position in a short time. Further, the photo-detecting surface of the photo-detector 16 is located at a position located almost in the middle of a first focal point 19a and a second focal point 20a of the detection lens 15 in the optical axis direction (Z1 direction of FIG. 1), and the photo-detecting surface of the photo-detector 18 is located at a position located almost in the middle of a first focal point 19b and a second focal point 20b of the detection lens 17 in the optical axis direction (Z2 direction of FIG. 1).

Figure 3:
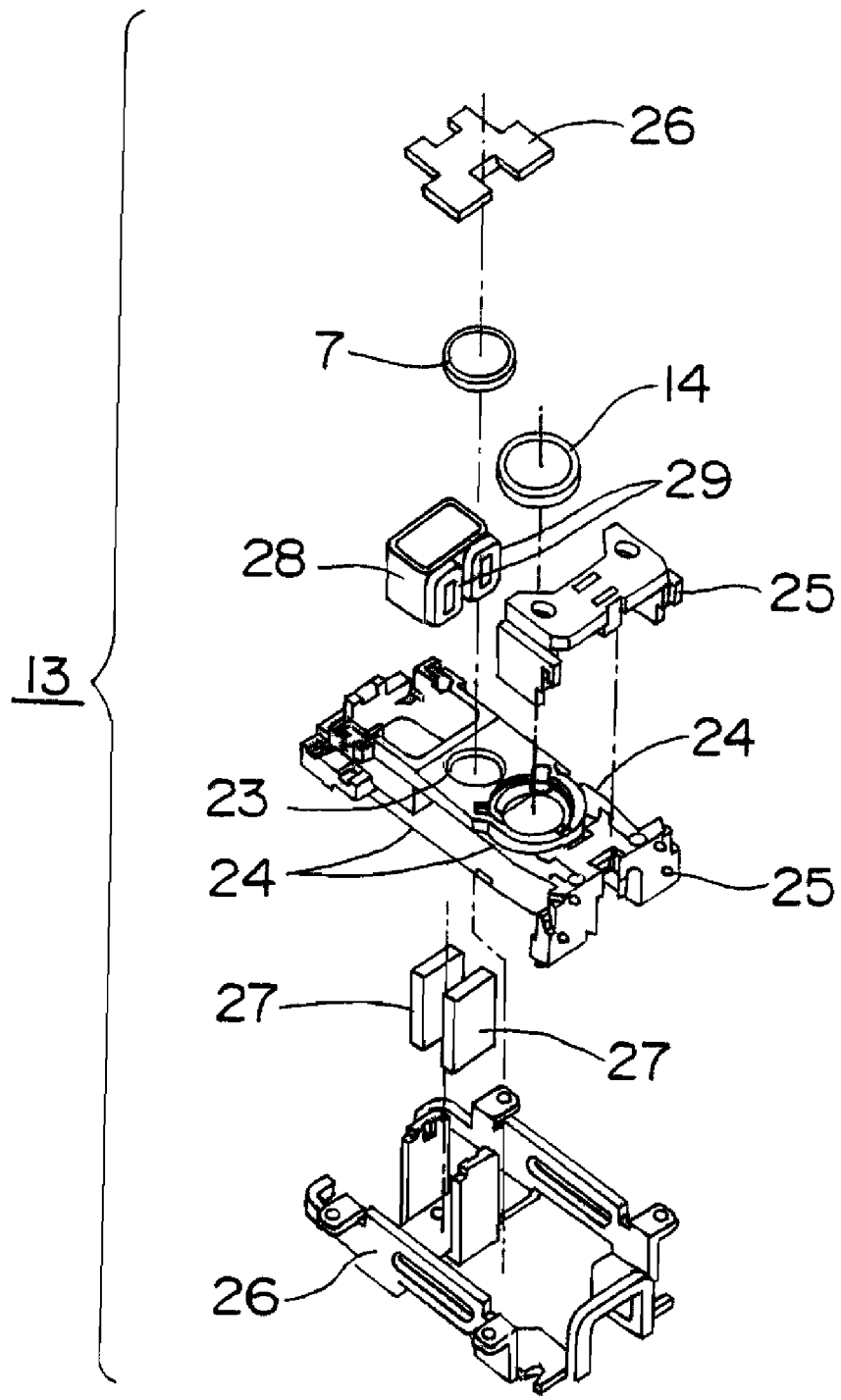
FIG. 3 is an exploded perspective view showing a configuration of an objective lens actuator 13 of FIGS. 1 and 2.

FIG. 3 is an exploded perspective view showing a configuration of the objective lens actuator 13 of FIGS. 1 and 2. Referring to FIG. 3, the objective lens actuator 13 is constituted of a lens holder 23 for holding the objective lenses 7 and 14, a wire suspension 24, a fixed base 25 for retaining the wire suspension 24, a yoke 26, a magnet 27, a focus coil 28, and a tracking coil 29. The objective lens actuator 13 integrally moves the objective lenses 7 and 14 in the focus direction by the focus coil 28 and the magnet 27 and integrally moves the objective lenses 7 and 14 in the radial direction by electrifying the tracking coil 29.

Figure 4:
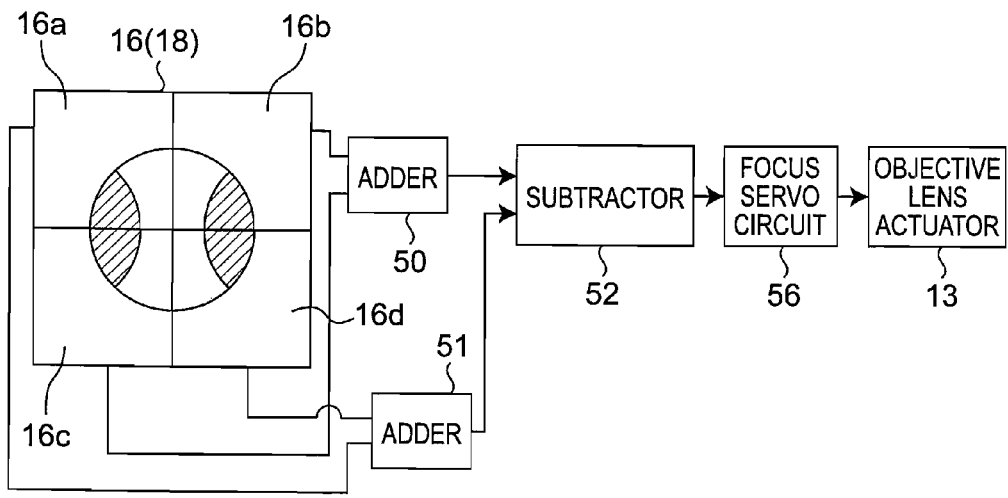
FIG. 4 is a block diagram showing a photo-detecting surface of a photo-detector 16 of FIG. 1 and the configuration of a focus servo control circuit.

FIG. 4 is a block diagram showing a photo-detecting surface of the photo-detector 16 of FIG. 1 and the configuration of a focus servo control circuit. Referring to FIG. 4, the photo-detector 16 is constructed of photo-detecting parts 16a to 16d and outputs a focus error signal in a push-pull system. The portions indicated by the hatched lines in the photo-detecting parts 16a to 16d indicate the diffraction regions of zero-th-order light and positive and negative first-order lights. The photo-detecting parts 16a to 16d output output signals corresponding to the quantities of detected light on the respective photo-detecting surfaces. An adder 50 adds up the output signals of the photo-detecting parts 16b and 16c, and outputs the resultant, and an adder 51 adds up the output signals of the photo-detecting parts 16a and 16d and outputs the resultant. A subtractor 52 subtracts the output signal of the adder 51 from the output signal of the adder 50 and outputs the resultant as a focus error signal. The focus error signal outputted from the subtractor 52 is inputted to a focus servo circuit 56 and used for focus servo control of the objective lens actuator 13 by means of the focus coil 28 and the magnet 27 of FIG. 3.

Figure 5:
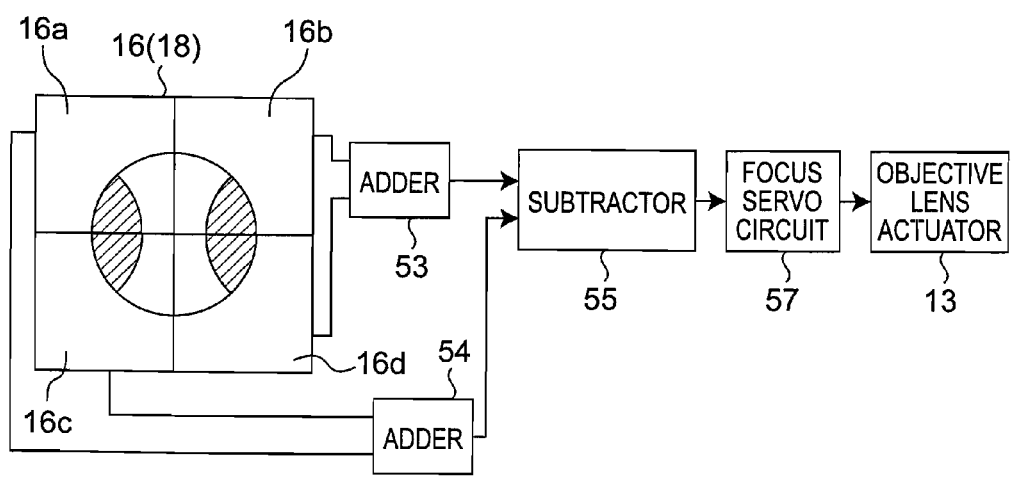
FIG. 5 is a block diagram showing a photo-detecting surface of a photo-detector 16 of FIG. 1 and the configuration of a tracking servo control circuit.

FIG. 5 is a block diagram showing a photo-detecting surface of the photo-detector 16 of FIG. 1 and the configuration of a tracking servo control circuit. The portions indicated by the hatched lines indicate the diffraction regions of the zero-th-order light and the positive and negative first-order lights. The photo-detector 16 is constructed of the photo-detecting parts 16a to 16d and outputs a tracking error signal in a push-pull system as described above. The photo-detecting parts 16a to 16d output output signals corresponding to the quantities of light on the respective photo-detecting surfaces. An adder 53 adds up the output signals of the photo-detecting parts 16b and 16d and outputs the resultant, and an adder 54 adds up the output signals of the photo-detecting parts 16a and 16c and outputs the resultant. A subtractor 55 subtracts the output signal of the adder 53 from the output signal of the adder 52 and outputs the resultant as a tracking error signal. The tracking error signal outputted from the subtractor 55 is inputted to a tracking servo circuit 57 and used for tracking servo control of the objective lens actuator 13 by means of the tracking coil 29 of FIG. 3.

Although the photo-detector 16 is constructed of the four photo-detecting parts 16a to 16d in FIGS. 4 and 5, the present invention is not limited to this configuration, and the photo-detector 16 may be constructed of three or less or five or more photo-detecting parts. Since the photo-detector 18 has a configuration similar to that of the photo-detector 16, no detailed description is provided therefor.

Figure 6A:
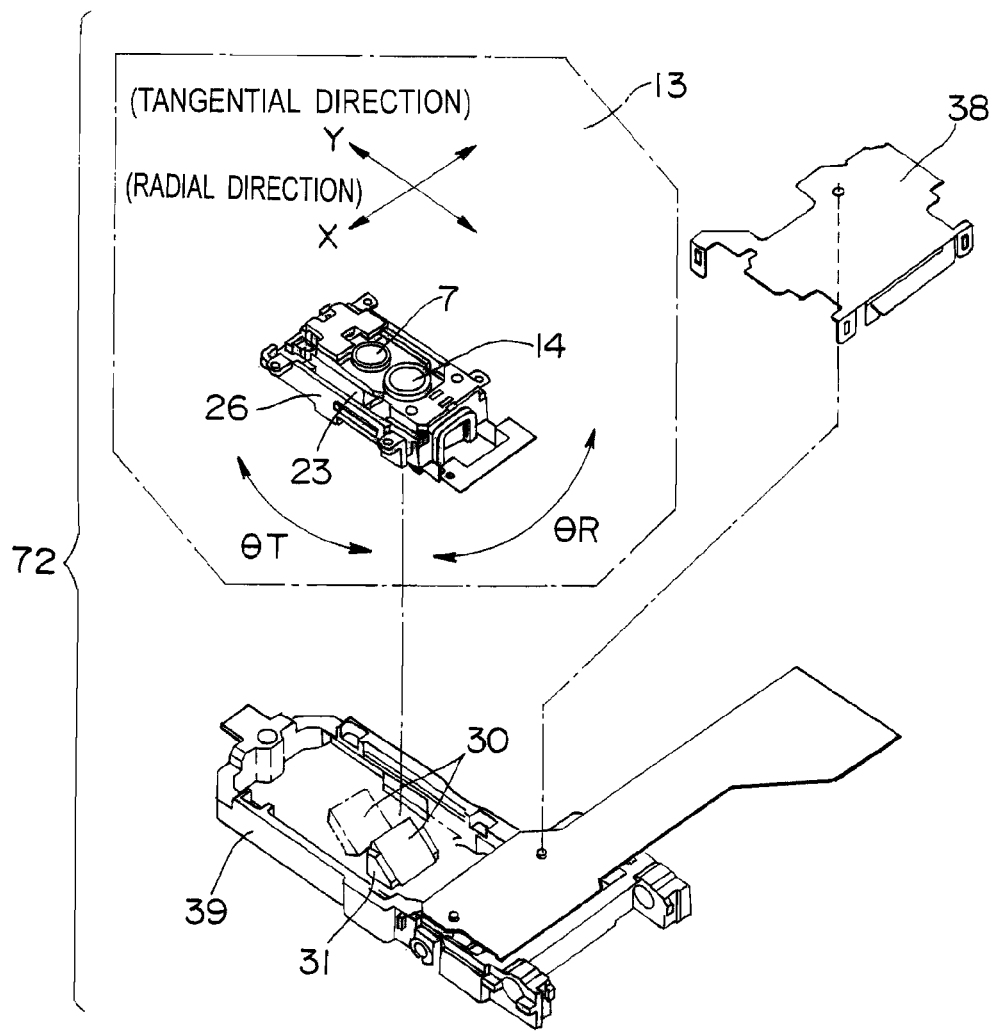
FIG. 6A is an exploded perspective view showing a configuration of the optical head device according to the first preferred embodiment of the present invention.
Figure 6B:
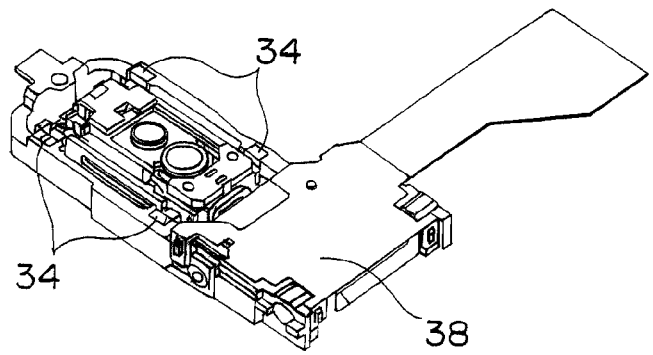
FIG. 6B is a perspective view showing an assembled state of the optical head device of FIG. 6A.

FIG. 6A is an exploded perspective view showing a configuration of the optical head device of the present preferred embodiment. FIG. 6B is a perspective view showing an assembled state of the optical head device of FIG. 6A. Referring to FIG. 6A, the objective lens actuator 13 is adjusted in the tangential direction (Y direction) and the radial direction (X direction) with respect to the optical base 39 and subjected to skew adjustments in a tangential angular direction (θT direction) and a radial angular direction (θR direction) in the assembling stage, and thereafter, the objective lens actuator 13 is fixed to the optical base 39 with an adhesive 34 or the like with a cover 38 attached to the objective lens actuator 13 as shown in FIG. 6B.

Figure 7:
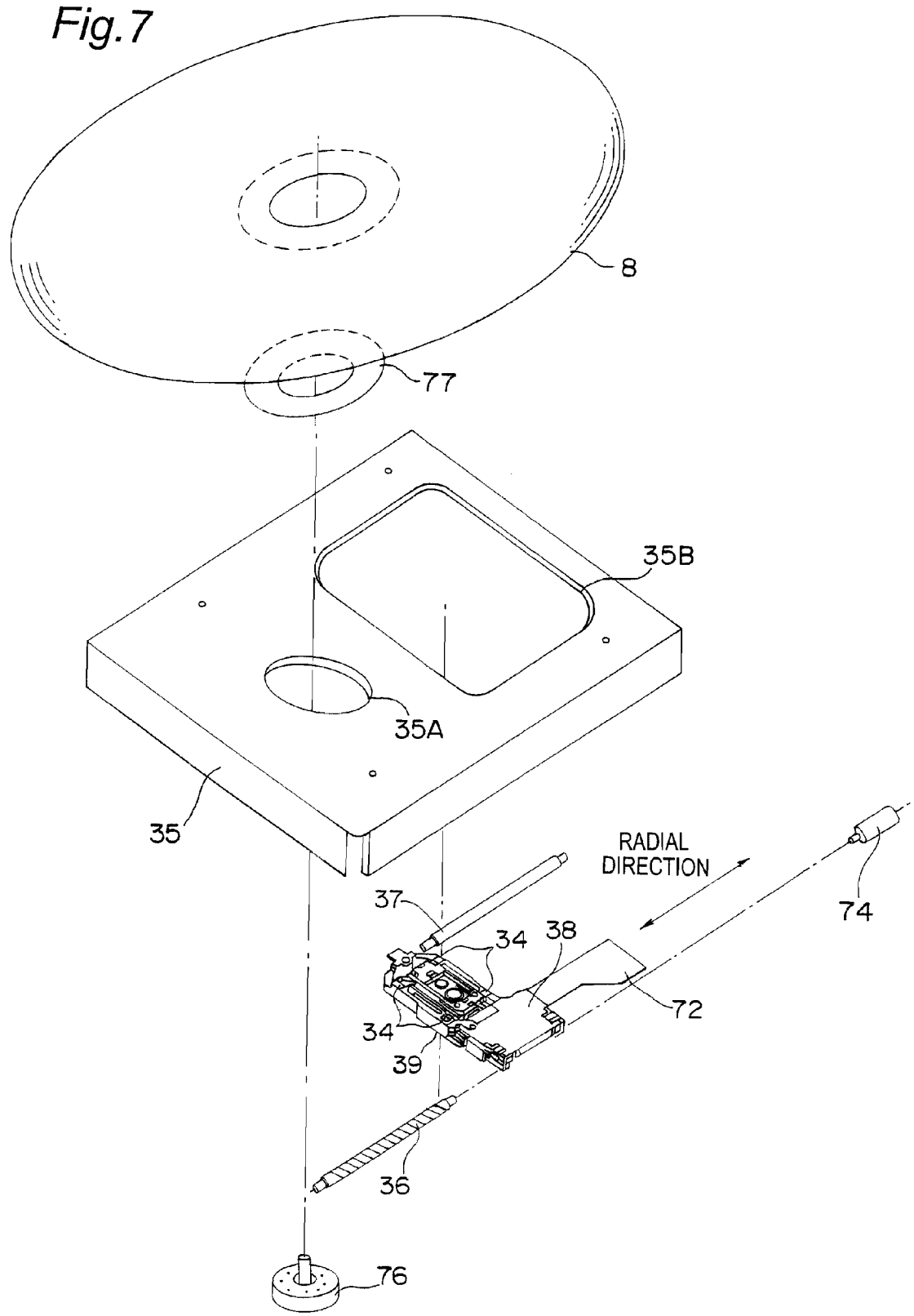
FIG. 7 is an exploded perspective view showing a configuration of the essential part of a disc recording and reproducing apparatus according to the first preferred embodiment of the present invention.

FIG. 7 is an exploded perspective view showing a configuration of the essential part of a disc recording and reproducing apparatus equipped with the optical head device 72 shown in FIGS. 6A and 6B. Referring to FIG. 7, the optical head device is engaged with a main shaft 36 and a countershaft 37, which are fixed to a mechanism base 35, and moved in the radial direction by turning the main shaft 36 by a traverse motor 74. A spindle motor 76 is fitted to a hole 35A provided at the mechanism base 35, and a turntable 77 for placing thereon the information recording medium 8 via the hole 35A is fixed to the spindle motor 76. The objective lenses of the optical head device 72 form a light spot at a predetermined position on the recording surface of the information recording medium 8 rotated by the spindle motor 76 through a hole 35B of the mechanism base 35 and reproduces the information signal recorded on the information recording medium 8 or records an information signal on the information recording medium 8.

Figure 25:
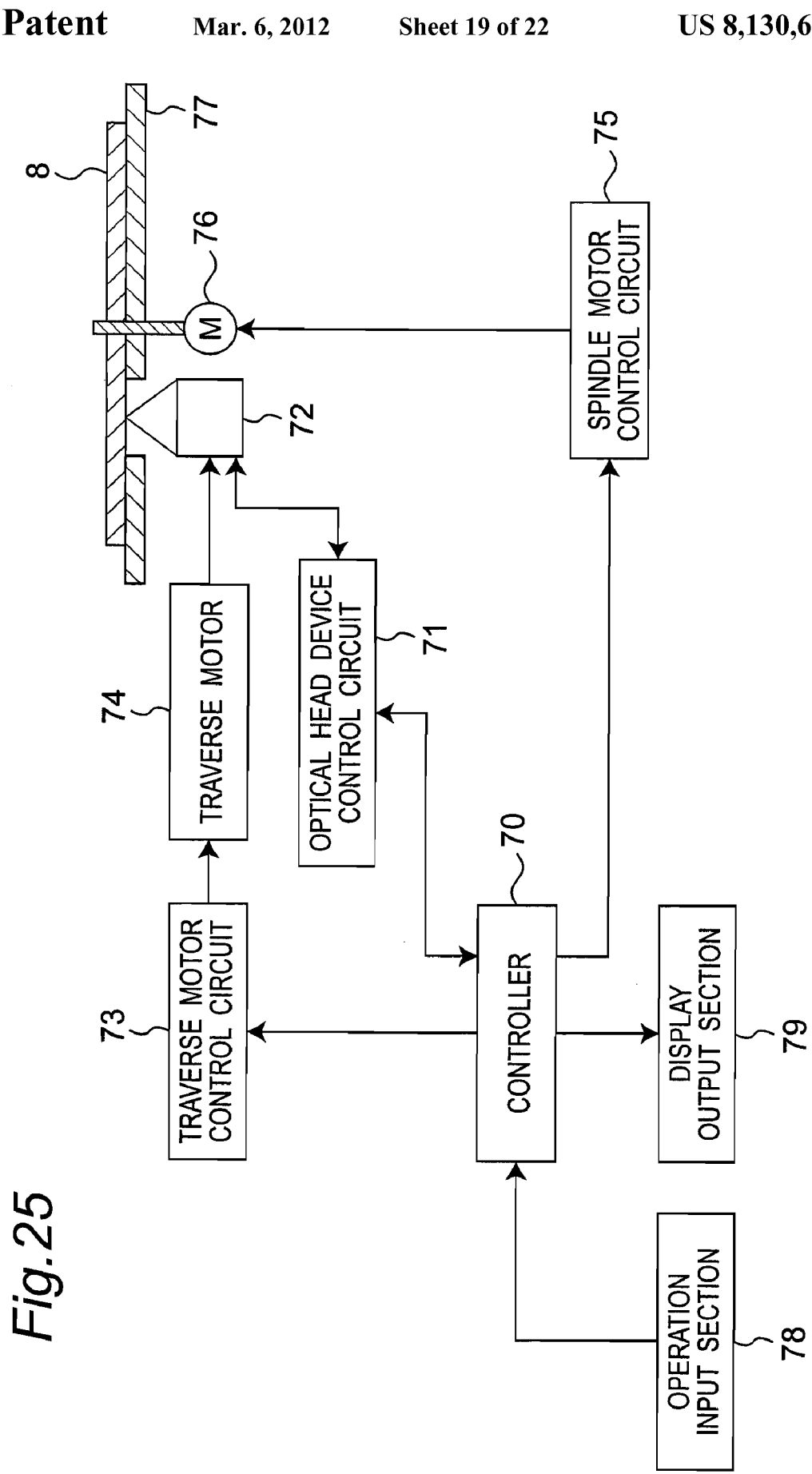
FIG. 25 is a block diagram showing a configuration of a disc recording and reproducing apparatus equipped with the optical head device according to the first preferred embodiment of the present invention.

In addition, FIG. 25 is a block diagram showing a configuration of a disc recording and reproducing apparatus equipped with the optical head device of the present preferred embodiment. Referring to FIG. 25, the disc recording and reproducing apparatus is constituted of a controller 70, an optical head device control circuit 71, an optical head device 72, a traverse motor control circuit 73, a traverse motor 74, a spindle motor control circuit 75, a spindle motor 76, a turntable 77, an operation input circuit 78, and a display output section 79. The controller 70 controls the traverse motor 74 by controlling the traverse motor control circuit 73 in accordance with a signal inputted from the operation input circuit 78 and controls the spindle motor 76 by controlling the spindle motor control circuit 75. In addition, the controller 70 controls the optical head device 72 by controlling the optical head device control circuit 71 in accordance with the signal inputted from the operation input circuit 78. The optical head device 72 reproduces an information signal from the recording surface of the information recording medium 8 placed on the turntable 77 rotated by the spindle motor 76 or records an information signal on the information recording medium 8.

Figure 8A:
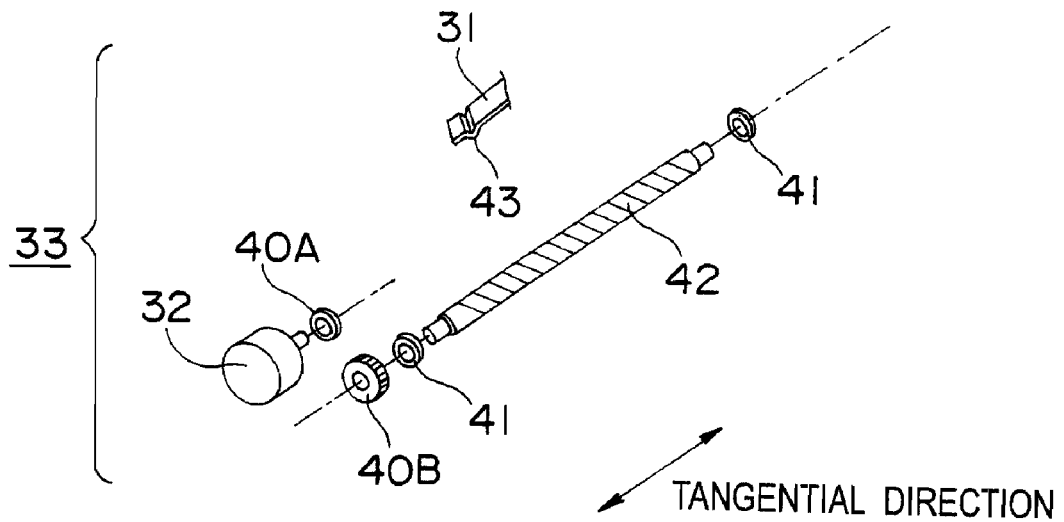
FIG. 8A is an exploded perspective view showing one example of the configuration of a moving mechanism 33 according to the first preferred embodiment of the present invention.
Figure 8B:
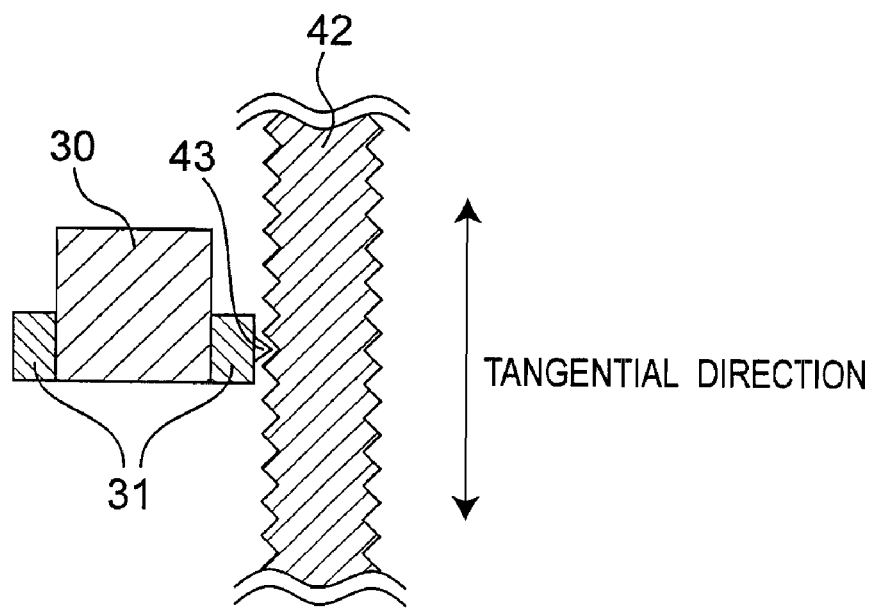
FIG. 8B is a sectional view showing one example of the configuration of the moving mechanism 33 according to the first preferred embodiment of the present invention.

FIG. 8A is an exploded perspective view showing one example of the configuration of the moving mechanism 33 for moving the upward-reflecting mirror 30. Referring to FIG. 8A, the moving mechanism 33 is constituted of a driving force 32, gears 40A and 40B, a bearing 41, and a lead screw 42. The driving force 32 is, for example, a DC motor, a stepping motor, an ultrasonic motor or the like. FIG. 8B is a sectional view showing one example of the configuration of the moving mechanism 33 for moving the upward-reflecting mirror 30. In FIGS. 8A and 8B, an engagement portion 43 is provided on the retention member 31 that retains the upward-reflecting mirror 30. The engagement portion 43 is, for example, a projection fitted to a spiral groove provided on the lead screw 42. By rotating the driving force 32, its rotation is transmitted to the lead screw 42 through the gears 40A and 40B, and the lead screw 42 turns to thereby move the retention member 31 that retains the upward-reflecting mirror 30 in the tangential direction. Although the driving force 32 is connected to the lead screw 42 through the gear 40 and the bearing 41 of FIG. 8A, the driving force 32 and the lead screw 42 may be directly connected together.

Figure 9:
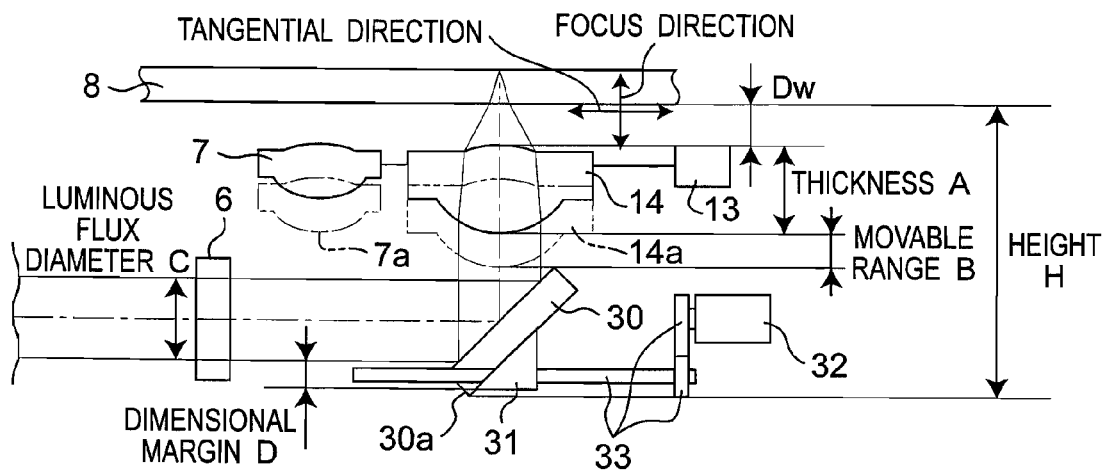
FIG. 9 is a schematic view of an optical system showing an essential part of the optical head device according to the first preferred embodiment of the present invention in a case where laser light having a wavelength of 405 nm is used.

FIG. 9 is a schematic view of an optical system showing an essential part of the optical head device in a case where laser light having a wavelength of 405 nm is used. Referring to FIG. 9, it is assumed that the thickness of the objective lens 14 is A, the movable range in the focus direction of the objective lenses 7 and 14 is B, the luminous flux diameter of the laser light incident on the upward-reflecting mirror 30 is C, a dimensional margin in consideration for the external chipped edges, non-uniform deposition of reflection coatings and so on of the upward-reflecting mirror 30 is D, a distance (working distance) from the objective lenses 7 and 14 to the information recording medium 8 is Dw, and the total height of the optical head device is H. By arranging the objective lenses 7 and 14 and the upward-reflecting mirror 30 in positions such that the luminous flux is not interrupted even when each of the objective lenses 7 and 14 is lowered to the maximum value of the movable range B, the deterioration of the recording and reproducing performances ascribed to the eclipse of the luminous flux is prevented. Assuming that the numerical aperture of the objective lenses is NA and the focal distance is f, the luminous flux diameter C is expressed by the Equation (1). In addition, the total height H of the optical head device is expressed by the Equation (2).

In a case where laser light having a wavelength of 405 nm is used as shown in FIG. 9, the upward-reflecting mirror 30 is moved to the position 30a to oppose the objective lens 14 by moving the retention member 31 in the tangential direction by the moving mechanism 33. The laser light having a wavelength of 405 nm emitted from the semiconductor laser 9 is reflected by the upward-reflecting mirror 30 and is condensed by the objective lens 14, and this leads to formation of a light spot on the information recording medium 8. The objective lens 14 moves to the position 14a at maximum in the focus direction in order to follow the surface sway of the information recording medium 8, and the objective lens 7 moves to the position 7a at maximum interlockingly with the objective lens 14.

Figure 10:
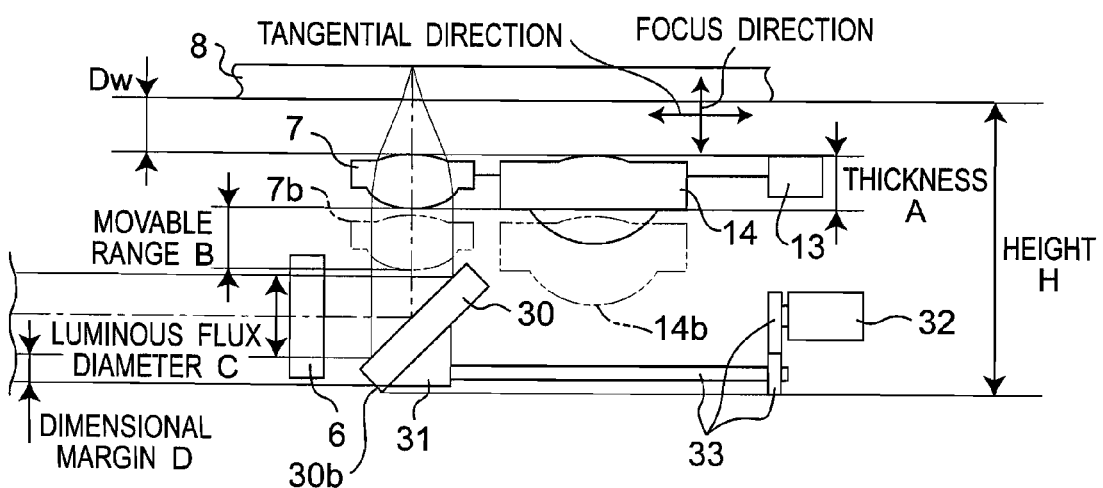
FIG. 10 is a schematic view of an optical system showing an essential part of the optical head device according to the first preferred embodiment of the present invention in a case where laser light having a wavelength of 650 nm is used.

FIG. 10 is a schematic view of an optical system showing an essential part of an optical head device in a case where laser light having a wavelength of 650 nm is used. When the laser light having a wavelength of 650 nm is used, the upward-reflecting mirror 30 is moved to the position 30b to oppose the objective lens 7 by moving the retention member 31 in the tangential direction by the moving mechanism 33. When the working distance Dw of the objective lens 7 is larger than the working distance Dw of the objective lens 14, the objective lens 7 is largely lowered in the direction of arrow Y of FIG. 10 and moves to the position 7b at maximum. Although the objective lens 14 is lowered to the position 14b at maximum interlockingly with the objective lens 7, the objective lens 14 does not collide with the upward-reflecting mirror 30 since the upward-reflecting mirror 30 has moved to the position 30b to oppose the objective lens 7 and is not located below the objective lens 14. Therefore, it becomes possible to reduce the height H of the optical head device, and it becomes possible to reduce the thickness of the optical head device and the disc recording and reproducing apparatus.

As described above, according to the optical head device of the first preferred embodiment, the moving mechanism 33 for moving the upward-reflecting mirror 30 is provided in the optical head device equipped with the plurality of objective lenses 7 and 14. Therefore, the objective lens 14 does not collide with the upward-reflecting mirror 30, and the total height of the optical head device can be reduced, thereby allowing the compact thin optical head device and disc recording and reproducing apparatus to be provided.

In the first preferred embodiment, the laser light having a wavelength of 650 nm is emitted from the semiconductor laser 1 and is condensed by the objective lens 7, and the laser light having a wavelength of 405 nm is emitted from the semiconductor laser 9, and is condensed by the objective lens 14. However, the present invention is not limited to this configuration, and it is acceptable that the laser light having a wavelength of 405 nm is emitted from the semiconductor laser 1 and is condensed by the objective lens 7 or that the laser light having a wavelength of 650 nm is emitted from the semiconductor laser 9 and is condensed by the objective lens 14. It is needless to say that laser light having a wavelength other than 405 nm and 650 nm can be employed. In such case, it is necessary to select one that reflects or transmits a proper wavelength as each of the polarization beam splitters 3 and 11 and the wavelength-selecting prism 4.

Figure 20:
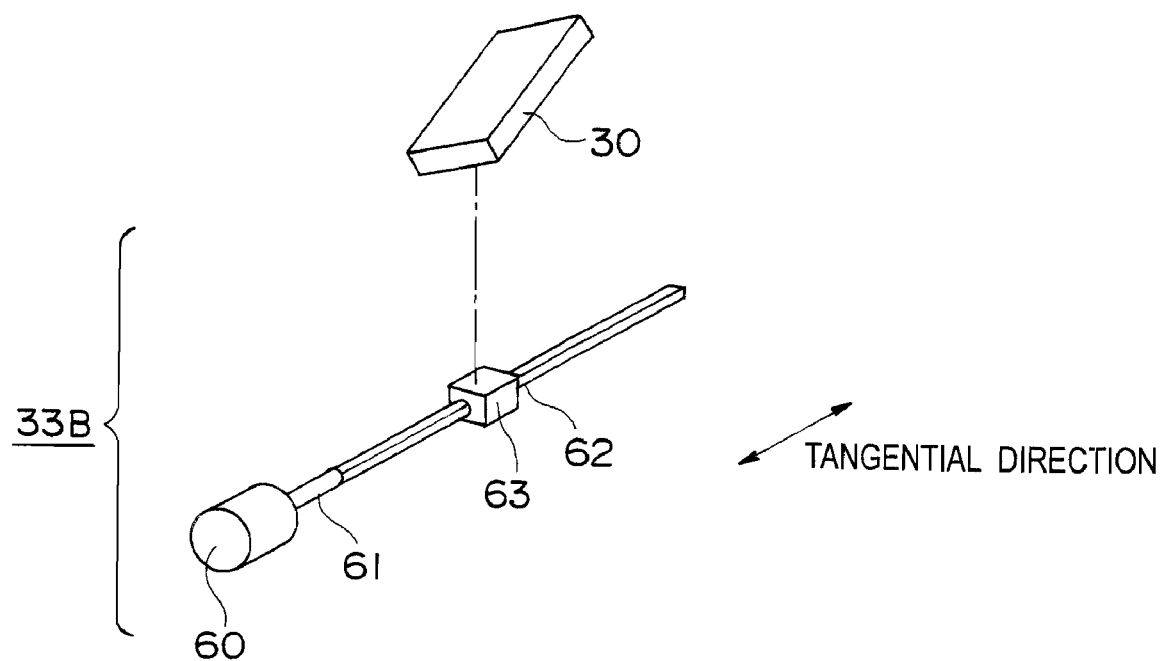
FIG. 20 is an exploded perspective view showing a configuration of a moving mechanism 33B according to the first preferred embodiment of the present invention.

In addition, the moving mechanism 33 moved the upward-reflecting mirror 30 by a motor constituted by a DC motor, a stepping motor, an ultrasonic motor or the like. However, the present invention is not limited to this configuration, and the upward-reflecting mirror 30 may be moved by a moving mechanism 33B having a configuration that employs a piezoelectric device as shown in FIG. 20 in place of the moving mechanism 33. Referring to FIG. 20, the moving mechanism 338 is constituted of a fixing member 60, a piezoelectric device 61, a driving friction member 62, and a moving member 63. The piezoelectric device 61 extends and contracts by a predetermined voltage pulse applied thereto, by which the moving member 63 fitted on the driving friction member 62 fixed to the piezoelectric device 61 moves in the tangential direction. By fixing the upward-reflecting mirror 30 to the moving member 63, the upward-reflecting mirror 30 moves in the tangential direction interlockingly with the moving member 63.

Figure 11:
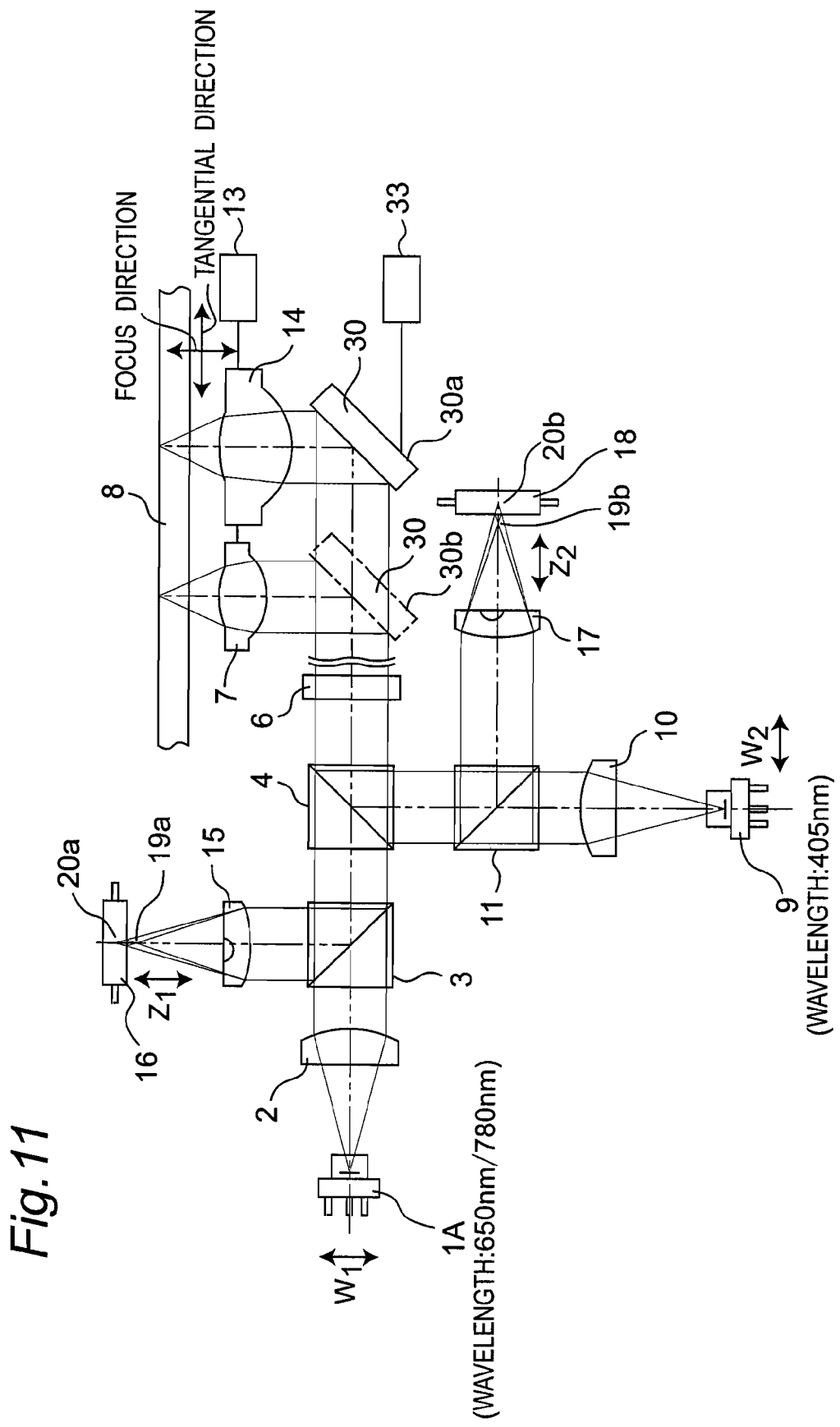
FIG. 11 is a schematic view of an optical system showing an essential part of an optical head device according to a first modified preferred embodiment of the first preferred embodiment of the present invention.
Figure 12:
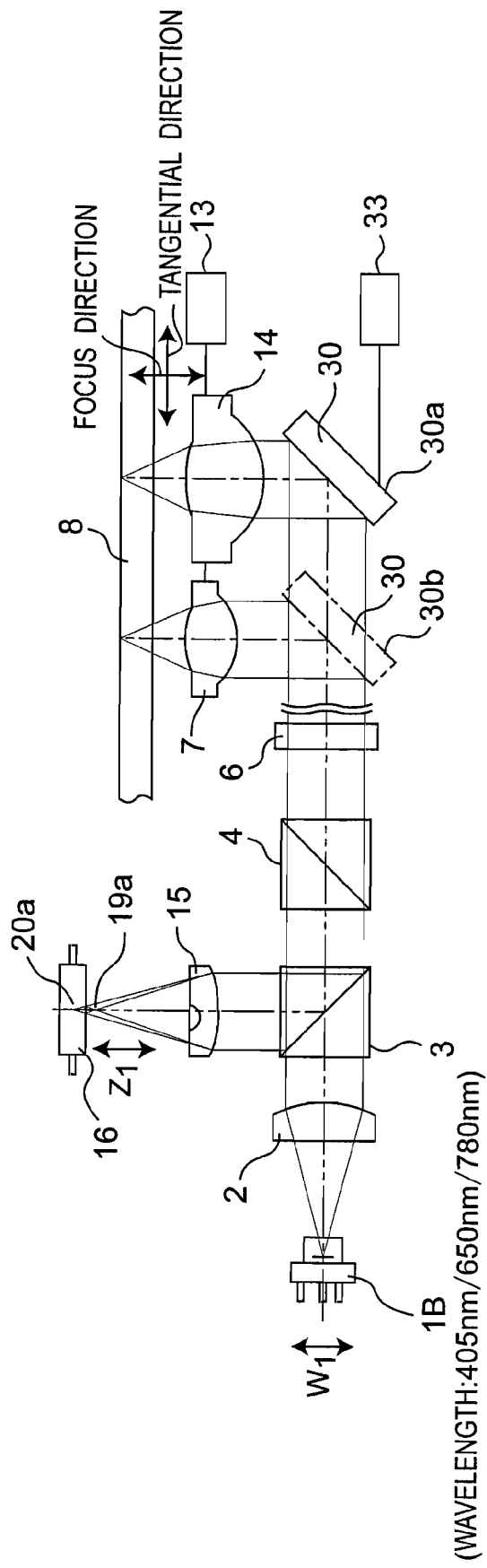
FIG. 12 is a schematic view of an optical system showing an essential part of an optical head device according to a second modified preferred embodiment of the first preferred embodiment of the present invention.

Further, the optical head device of the first preferred embodiment had two semiconductor lasers 1 and 9 and two objective lenses 7 and 14. However, the present invention is not limited to this configuration, and there may be a configuration that has one semiconductor laser for emitting laser light having one wavelength and two objective lenses as in the recording and reproducing apparatus for a BD and an HD-DVD. Otherwise, either one or both of the semiconductor laser 1 and the semiconductor laser 9 may output laser light having a plurality of wavelengths. For example, as shown in FIG. 11, it is acceptable to provide a semiconductor laser 1A in place of the semiconductor laser 1, make the semiconductor laser 1A output two kinds of laser lights of a wavelength of 650 nm and a wavelength of 780 nm and make the objective lens 7 comply with two kinds of laser lights having a wavelength of 650 nm and a wavelength of 780 nm. In such case, it is necessary to select one that reflects or transmits a proper wavelength as each of the polarization beam splitters 3 and 11 and the wavelength-selecting prism 4 and to constitute the upward-reflecting mirror 30 so as to reflect at least three kinds of laser lights having a wavelength of 780 nm, a wavelength of 650 nm, and a wavelength of 405 nm. Further, as shown in, for example, FIG. 12, it is acceptable that the optical head device has only one semiconductor laser 1B in place of the two semiconductor lasers 1 and 9 and that the semiconductor laser 1B outputs three kinds of laser lights having a wavelength of 405 nm, a wavelength of 650 nm, and a wavelength of 780 nm. In this case, the collimating lens 10, the polarization beam splitter 11, the detection lens 17 and the photodetector 18 in the first preferred embodiment shown in FIG. 1 can be removed, and the optical head device can be further reduced in size. In addition, referring to FIG. 12, it is necessary to select one that reflects or transmits a proper wavelength as each of the polarization beam splitter 3 and the wavelength-selecting prism 4 and to constitute the upward-reflecting mirror 30 so as to reflect at least three kinds of laser lights having a wavelength of 780 nm, a wavelength of 650 nm, and a wavelength of 405 nm.

Figure 21:
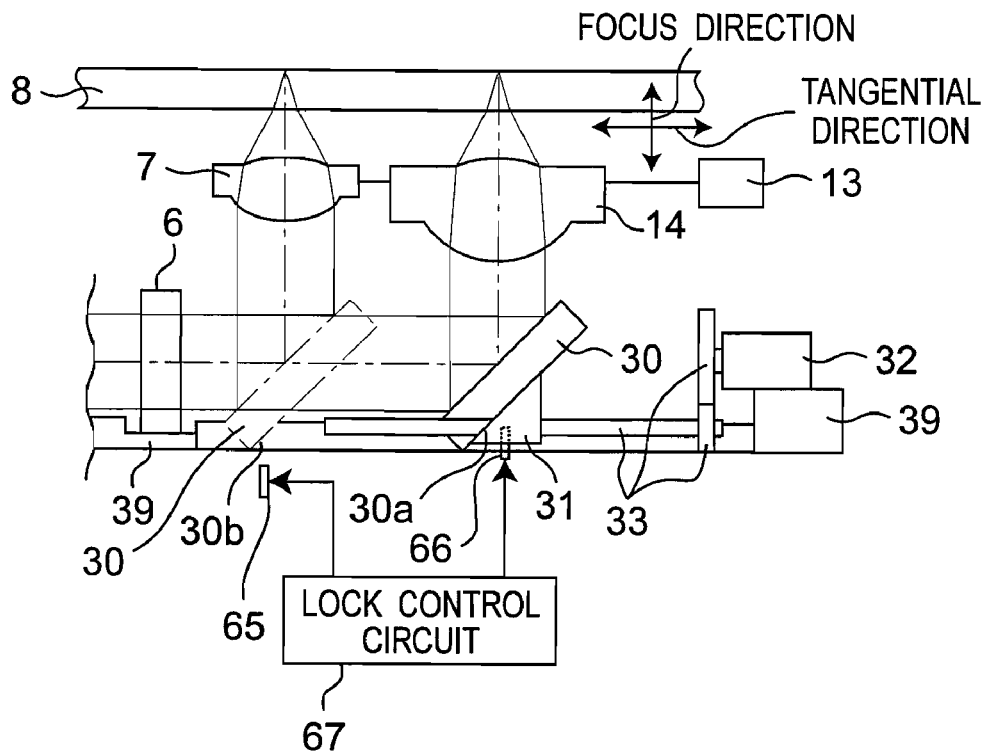
FIG. 21 is a schematic view of an optical system showing an essential part of an optical head device according to a third modified preferred embodiment of the first preferred embodiment of the present invention.

Still further, a lock mechanism for fixing the upward-reflecting mirror 30 at a predetermined position as shown in FIG. 21 may be provided. Referring to FIG. 21, the lock mechanism is constituted of pins 65 and 66 and a lock control circuit 67. By performing control so that the pin 66 is fitted to a hole (not shown) provided at the retention member 31 when, for example, the upward-reflecting mirror 30 moves to a position just below the objective lens 14, the position of the upward-reflecting mirror 30 is fixed to the position just below the objective lens 14. Likewise, by performing control so that the pin 65 is fitted to a hole (not shown) provided at the retention member 31 when the upward-reflecting mirror 30 moves to a position just below the objective lens 7, the position of the upward-reflecting mirror 30 is fixed to the position just below the objective lens 7. With this arrangement, the upward-reflecting mirror 30 can be fixed in an accurate position even when the optical head device is vibrated after the upward-reflecting mirror 30 has once moved to the position 30a or 30b to oppose the objective lens 14 or 7, and the position of the light spot on the information recording medium 8 does not deviate. In addition, the upward-reflecting mirror 30 may be fixed at a position by the self-retention characteristic of the driving force 32 in place of the lock mechanism.

In addition, the quarter-wave plate 6 is provided between the upward-reflecting mirror 30 and, the wavelength-selecting prism 4 in the first preferred embodiment. However, the present invention is not limited to this configuration, and it is acceptable that the quarter-wave plate 6 is provided between the upward-reflecting mirror 30 and the objective lenses 7 and 14 or that the quarter-wave plate 6 is removed when only the linearly polarized light is used.

Further, although the luminous flux is incident from the left-hand side of the sheet plane in the first preferred embodiment, it is needless to say that the same luminous flux is incident from the right-hand side.

Still further, although the luminous fluxes incident on the objective lenses 7 and 14 have an almost identical luminous flux diameter for the sake of simplicity of explanation, it is needless to say that the same diameter is practically changed depending on the specifications of the objective lenses.

Second Preferred Embodiment

Figure 13:
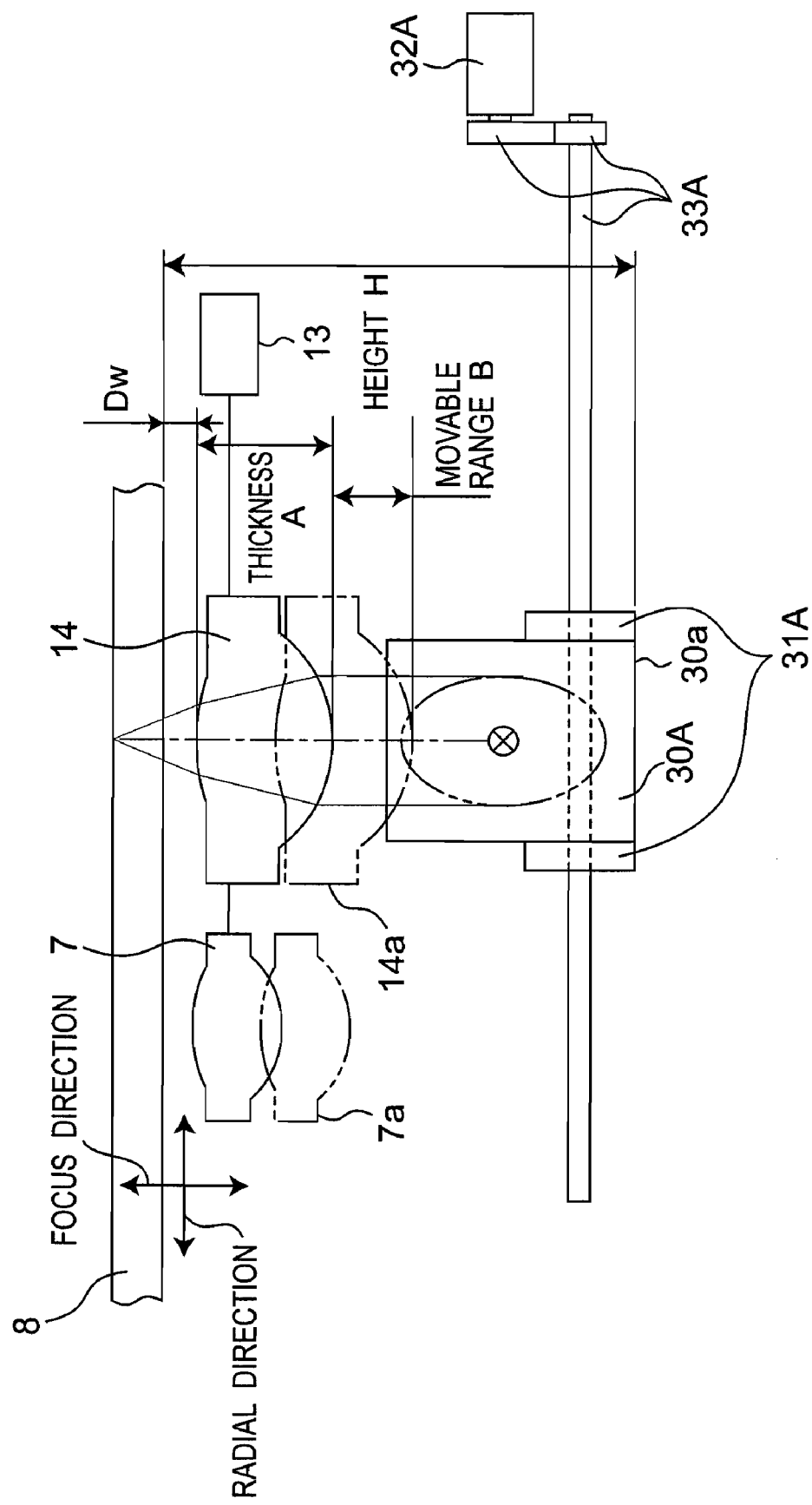
FIG. 13 is a schematic view of an optical system showing an essential part of an optical head device according to a second preferred embodiment of the present invention in a case where laser light having a wavelength of 405 nm is used.

FIG. 13 is a schematic view of an optical system showing an essential part of an optical head device according to the second preferred embodiment in a case where laser light having a wavelength of 405 nm is used. Referring to FIG. 13, the optical head device of the present preferred embodiment differs from the optical head device of the first preferred embodiment shown in FIGS. 1 to 10 in that the objective lenses 7 and 14 are arranged in the radial direction instead of being arranged in the tangential direction and an upward-reflecting mirror 30A, a retention member 31A, a driving force 32A and a moving mechanism 33A are provided in place of the upward-reflecting mirror 30, the retention member 31, the driving force 32 and the moving mechanism 33. The optical head device of the present preferred embodiment is similar to the optical head device of the first preferred embodiment in other respects, and no detailed description is provided for the components denoted by the same reference numerals.

Referring to FIG. 13, the upward-reflecting mirror 30A is retained by the retention member 31A, and the retention member 31A is moved in the radial direction by the driving force 32A and the moving mechanism 33A. In a case where laser light having a wavelength of 405 nm is used, the retention member 31A is moved to the position 30a to oppose the objective lens 14. The laser light having a wavelength of 405 nm outputted from the semiconductor laser 9 (See FIG. 2) is made incident on the upward-reflecting mirror 30A from above in a direction perpendicular to the sheet plane, is reflected in the direction of the objective lens 14, and is condensed by the objective lens 14, and this leads to formation of a light spot on the information recording medium 8.

Figure 14:
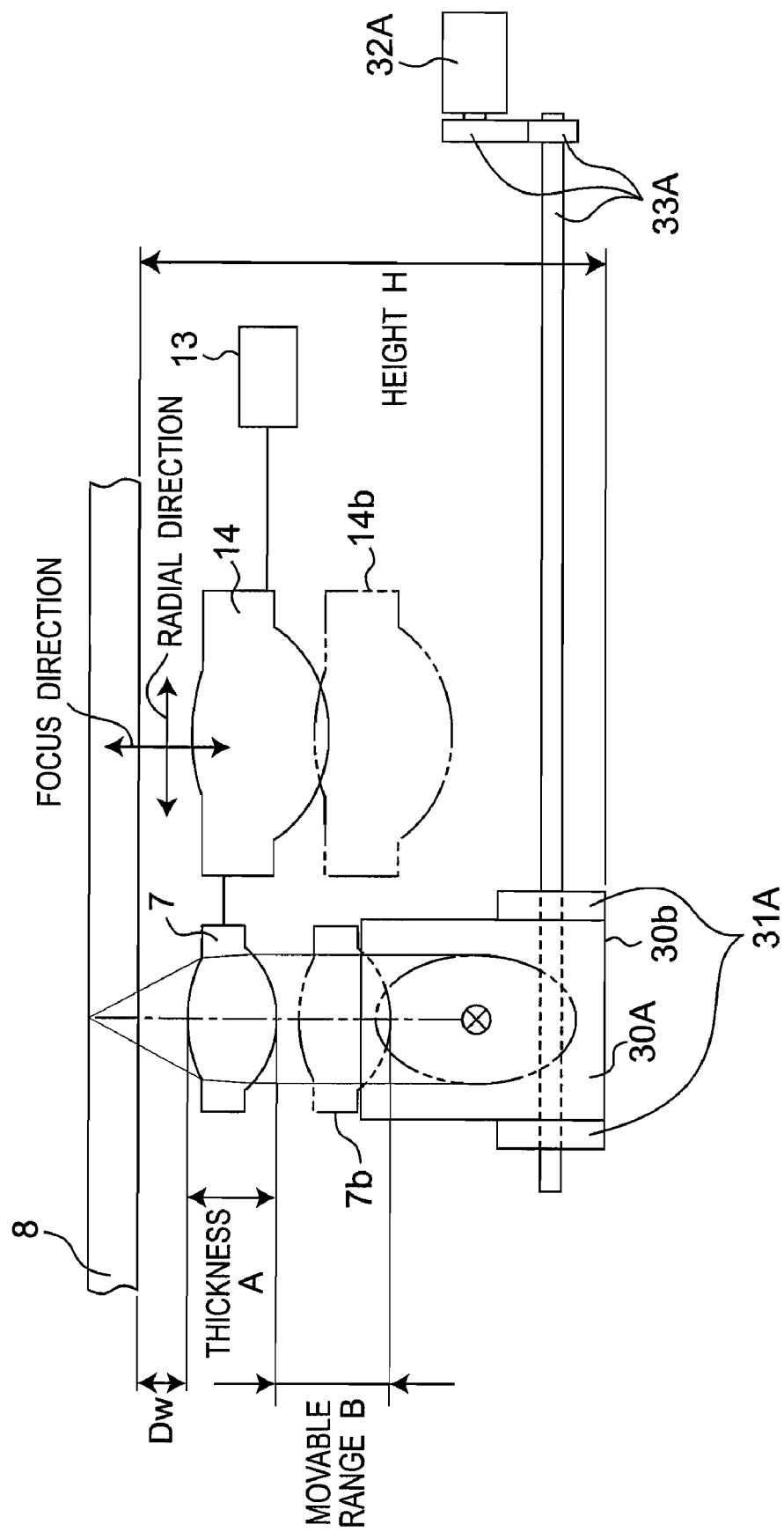
FIG. 14 is a schematic view of an optical system showing an essential part of the optical head device according to the second preferred embodiment of the present invention in a case where laser light having a wavelength of 650 nm is used.

FIG. 14 is a schematic view of an optical system showing an essential part of the optical head device of the present preferred embodiment in a case where laser light having a wavelength of 650 nm is used. When the laser light having a wavelength of 650 nm is used, the retention member 31A is moved to the position 30b to oppose the objective lens 7 by the driving force 32A and the moving mechanism 33A. The laser light having a wavelength of 650 nm outputted from the semiconductor laser 1 (See FIG. 2) is made incident on the upward-reflecting mirror 30A from above in the direction perpendicular to the sheet plane, is reflected in the direction of the objective lens 7, and is condensed by the objective lens 7, and this leads to formation of a light spot on the information recording medium 8.

As described above, according to the optical head device of the present preferred embodiment, the collision of the objective lens 14 with the upward-reflecting mirror 30A can be avoided even when the objective lens 7 is moved to the position 7b in the focus direction while the objective lens 7 is used in the configuration in which the objective lenses 7 and 14 are arranged in the radial direction, and the optical head device can be reduced in thickness. By arranging a plurality of objective lenses in the radial direction, the apparatus can be reduced in size in the tangential direction.

Figure 15:
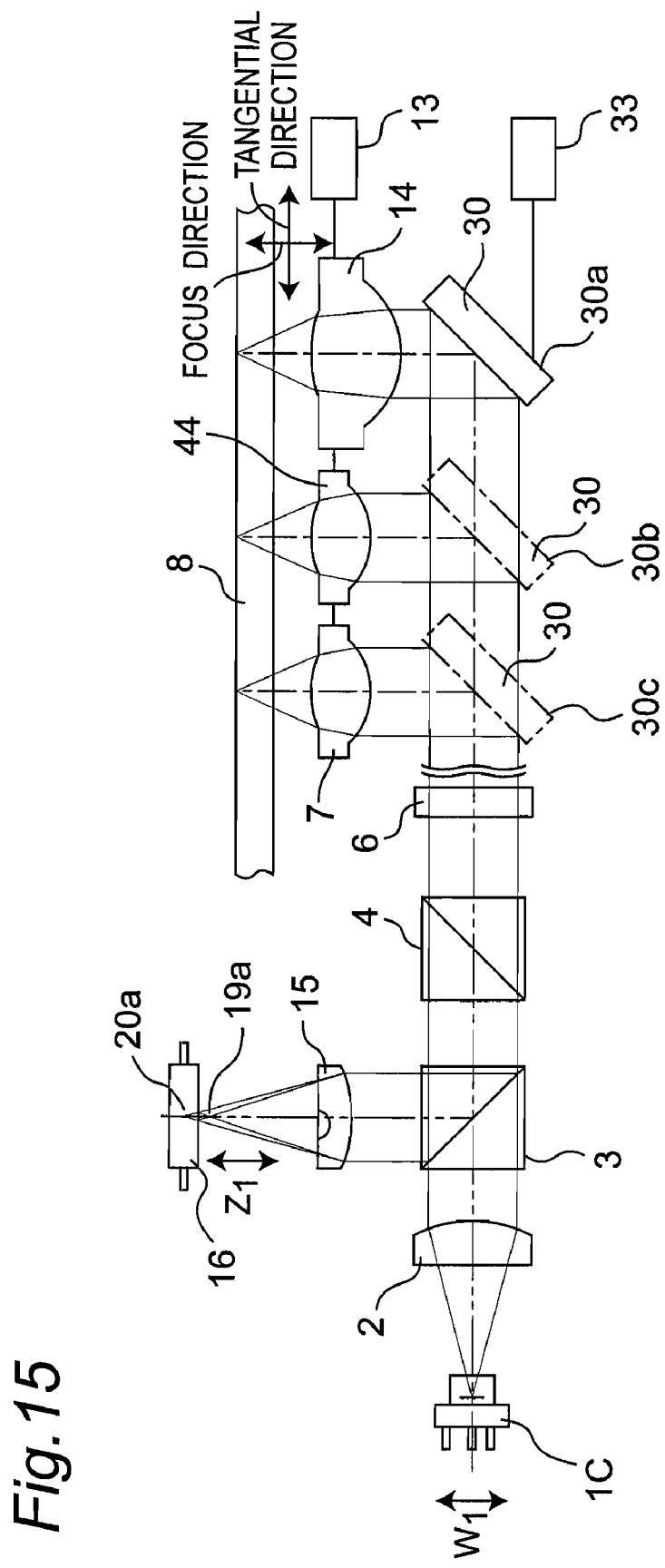
FIG. 15 is a schematic view of an optical system showing an essential part of an optical head device according to a modified preferred embodiment of the second preferred embodiment of the present invention.

Although the optical head devices of the first and second preferred embodiments have two objective lenses 7 and 14, it is acceptable that three or more objective lenses 7, 14 and 44 are provided and that a semiconductor laser 1C for outputting laser lights of a plurality of wavelengths is provided in place of the semiconductor lasers 1 and 9 as shown in, for example, FIG. 15. In this case, the objective lenses 7, 14 and 44 may be arranged in a line in the tangential direction or the radial direction or arranged in an arbitrary identical plane. When the objective lenses are arranged in an arbitrary identical plane, it is acceptable to make the moving mechanism 33 or 33A move the upward-reflecting mirror 30 or 30A in a biaxial movement or to provide another configuration capable of moving the upward-reflecting mirror 30 or 30A to an arbitrary position in an identical plane or to provide a configuration capable of moving the upward-reflecting mirror 30 or 30A also in the focus direction of the objective lenses 7, 14 and 44. Referring to FIG. 15, it is necessary to select one that reflects or transmits a proper wavelength as each of the polarization beam splitter 3 and the wavelength-selecting prism 4 and to constitute the upward-reflecting mirror 30 or 30A so as to reflect laser lights of the plurality of wavelengths.

Third Preferred Embodiment

Figure 16:
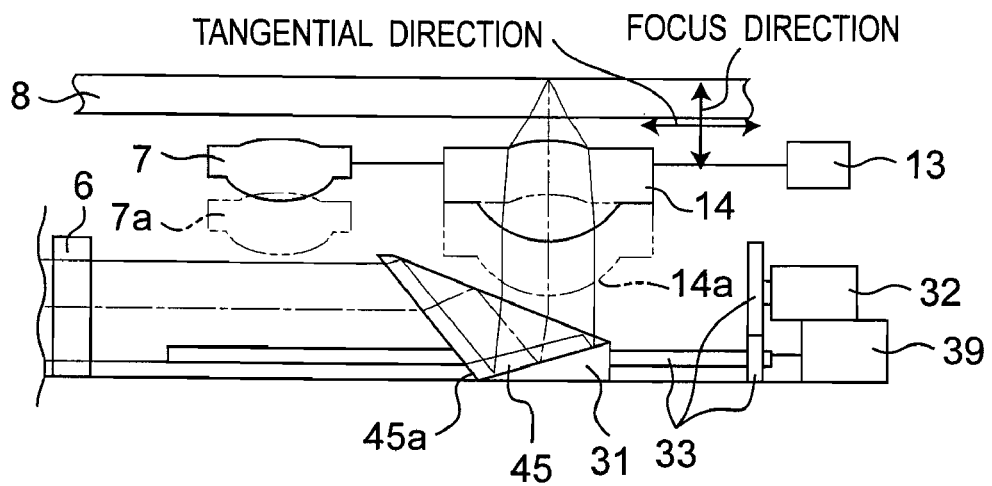
FIG. 16 is a schematic view of an optical system showing an essential part of an optical head device according to a third preferred embodiment of the present invention in a case where laser light having a wavelength of 405 nm is used.

FIG. 16 is a schematic view of an optical system showing an essential part in a case where laser light having a wavelength of 650 nm is used in an optical head device according to the third preferred embodiment. Referring to FIG. 16, the optical head device of the present preferred embodiment differs from the optical head device of the first preferred embodiment shown in FIGS. 1 to 10 in that a prism 45 is provided in place of the upward-reflecting mirror 30. The optical head device of the present preferred embodiment is similar to the optical head device of the first preferred embodiment in other respects, and no detailed description is provided for the components denoted by the same reference numerals.

Figure 24:
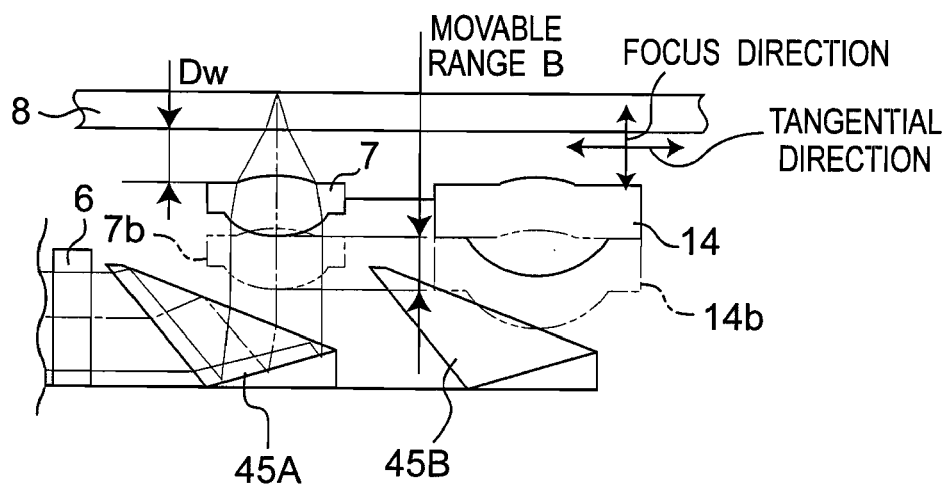
FIG. 24 is a schematic view of an optical system showing an essential part of an optical head device in a case where two prisms are arranged side by side.

FIG. 24 is a schematic view of an optical system showing an essential part of an optical head device in a case where two prisms 45A and 45B are arranged side by side in the tangential direction. When a plurality of upward-reflecting mirrors are employed, transmitted light of the first upward-reflecting mirror can be guided to the second upward-reflecting mirror as shown in, for example, FIG. 27. However, when a plurality of prisms are employed, such transmitted light cannot be utilized, and therefore, it is difficult to arrange two prisms 45A and 45B side by side as shown in FIG. 24. Even if the prisms 45A and 45B are arranged as shown in FIG. 24, there is a possibility that the objective lens 14 collides with the prism 45 as in the optical head device of the prior art shown in FIG. 28 when the working distance of the objective lens 7 is large.

Referring to FIG. 16, the prism 45 is retained by the retention member 31, and the retention member 31 is moved in the tangential direction by the driving force 32 and the moving mechanism 33. In a case where laser light having a wavelength of 405 nm is used, the retention member 31 is moved to a position 45a to oppose the objective lens 14. The laser light having a wavelength of 405 nm outputted from the semiconductor laser 9 (See FIG. 2) is made incident on the prism 45 and has its direction changed by the internal reflection of the emission plane. The laser light emitted from the prism 45 is condensed by the objective lens 14, and this leads to formation of a light spot on the information recording medium 8.

Figure 17:
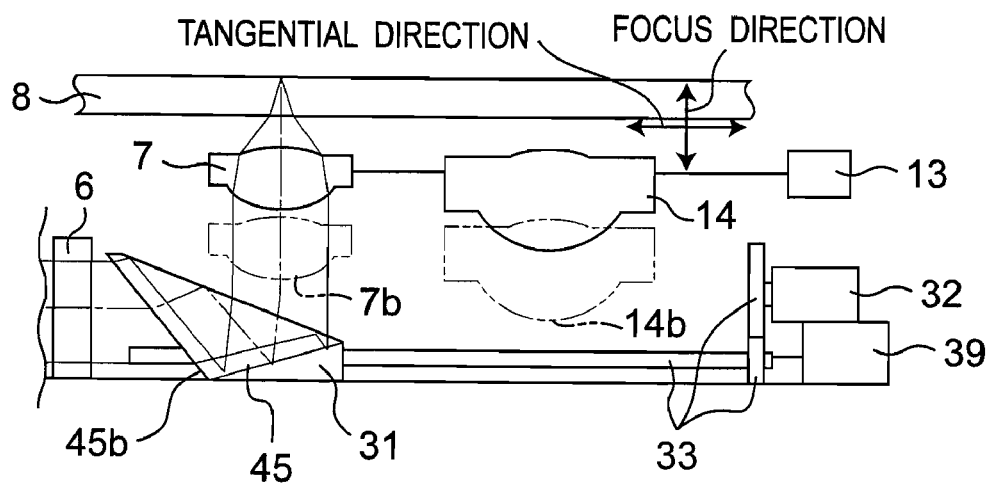
FIG. 17 is a schematic view of an optical system showing an essential part of the optical head device according to the third preferred embodiment of the present invention in a case where laser light having a wavelength of 650 nm is used.

FIG. 17 is a view showing an optical system configuration of the essential part in a case where laser light having a wavelength of 650 nm is used in the optical head device of the present preferred embodiment. Referring to FIG. 17, when the laser light having a wavelength of 650 nm is used, the retention member 31 is moved to the position 45b to oppose the objective lens 7. The laser light having a wavelength of 650 nm outputted from the semiconductor laser 1 (See FIG. 2) is made incident on the prism 45 and has its direction changed by the internal reflection of the emission plane. The laser light emitted from the prism 45 is condensed by the objective lens 7, and this leads to formation of a light spot on the information recording medium 8.

According to the above configuration, the collision of the objective lens 14 with the prism 45 can be avoided even when the objective lens 7 is moved to the position 7b while the objective lens 7 is used, and the optical head device can be reduced in thickness. In addition, by employing the prism 45 as means for reflecting the luminous flux and providing the moving mechanism 33 for moving the prism 45, the luminous flux diameter can be reduced further than in such case where the upward-reflecting mirror of the optical head device of the first preferred embodiment is employed, and the inclination of the surface of the prism 45 on the side facing the objective lens 7 can be reduced further than the inclination of the upward-reflecting mirror 30 of the optical head device of the first preferred embodiment. Therefore, it is possible to further reduce the total height of the optical head device.

As described above, according to the optical head device of the present preferred embodiment, more compact and thin optical head device and disc recording and reproducing apparatus can be provided by employing the prism 45 as means for reflecting the luminous flux.

In the present preferred embodiment, the objective lenses 7 and 14 are arranged in the tangential direction, and the prism 45 is moved in the tangential direction by the moving mechanism 33. However, the present invention is not limited to this configuration, and it is acceptable to arrange the objective lenses 7 and 14 in the radial direction and to move the prism 45 in the radial direction by the moving mechanism 33. In such case, the optical head device can be reduced in thickness, and the optical head device can be reduced in size in the tangential direction.

Fourth Preferred Embodiment

Figure 18:
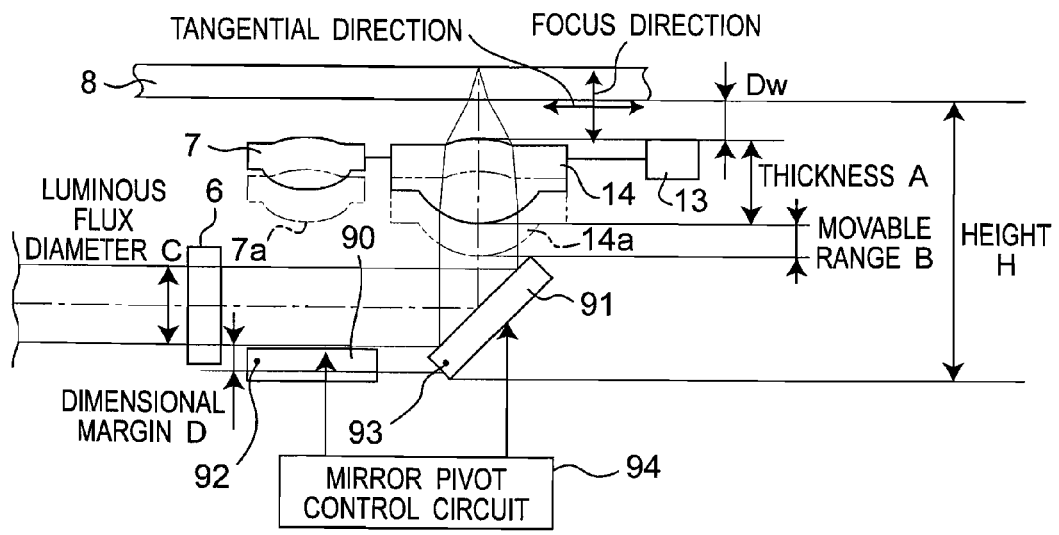
FIG. 18 is a schematic view of an optical system showing an essential part of an optical head device according to a fourth preferred embodiment of the present invention in a case where laser light having a wavelength of 405 nm is used.

FIG. 18 is a schematic view of an optical system showing an essential part in a case where laser light having a wavelength of 405 nm is used in an optical head device according to the fourth preferred embodiment. Referring to FIG. 18, the optical head device of the present preferred embodiment differs from the optical head device of the first preferred embodiment shown in FIGS. 1 to 10 in that two upward-reflecting mirrors 90 and 91 are provided in place of the upward-reflecting mirror 30 and a mirror pivot control circuit 94 that pivots the upward-reflecting mirrors 90 and 91 is provided. The upward-reflecting mirrors 90 and 91 are controlled so as to pivot around pivot axes 92 and 93, respectively, by the mirror pivot control circuit 94. The optical head device of the present preferred embodiment is similar to the optical head device of the first preferred embodiment in other respects, and no detailed description is provided for the components denoted by the same reference numerals.

In a case where laser light having a wavelength of 405 nm is used in FIG. 18, the mirror pivot control circuit 94 horizontally controls the upward-reflecting mirror 90 and makes the upward-reflecting mirror 91 oppose the objective lens 14 by inclining the upward-reflecting mirror 91 at a predetermined angle. The laser light having a wavelength of 405 nm outputted from the semiconductor laser 9 (See FIG. 2) is reflected by the upward-reflecting mirror 91 and has its direction changed by the upward-reflecting mirror 91. The laser light reflected by the upward-reflecting mirror 91 is condensed by the objective lens 14, and this leads to formation of a light spot on the information recording medium 8.

Figure 19:
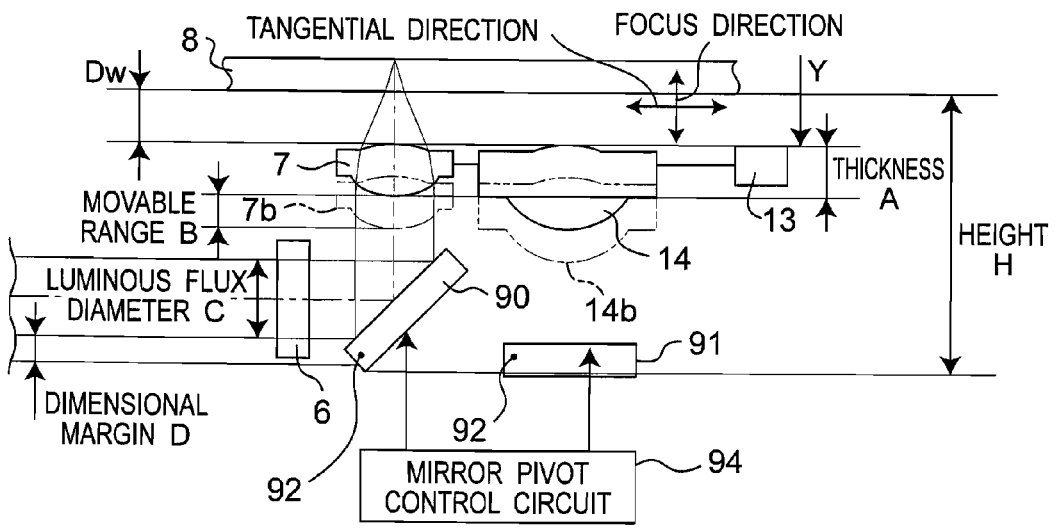
FIG. 19 is a schematic view of an optical system showing an essential part of the optical head device according to the fourth preferred embodiment of the present invention in a case where laser light having a wavelength of 650 nm is used.

FIG. 19 is a schematic view of an optical system showing an essential part in a case where laser light having a wavelength of 650 nm is used in the optical head device of the fourth preferred embodiment. In a case where laser light having a wavelength of 650 nm is used, the mirror pivot control circuit 94 makes the upward-reflecting mirror 90 oppose the objective lens 7 by inclining the upward-reflecting mirror 90 at a predetermined angle and horizontally controls the upward-reflecting mirror 91. The laser light having a wavelength of 650 nm outputted from the semiconductor laser 1 (See FIG. 2) is reflected by the upward-reflecting mirror 90 and has its direction changed by the upward-reflecting mirror 90. The laser light reflected by the upward-reflecting mirror 90 is condensed by the objective lens 7, and this leads to formation of a light spot on the information recording medium 8.

According to the above configuration, the mirror pivot control circuit 94 for pivoting the upward-reflecting mirrors 90 and 91 is provided in the optical head device that has the two upward-reflecting mirrors 90 and 91. Therefore, the upward-reflecting mirror 91 located below the objective lens 14 is horizontally controlled when the objective lens 7 is used, and the collision of the objective lens 14 with the upward-reflecting mirror 91 can be prevented. With this arrangement, the total height of the optical head device can be reduced.

As described above, according to the optical head device of the present preferred embodiment, a compact thin optical head device and a disc recording and reproducing apparatus can be provided with the mirror pivot control circuit 94 for pivoting the upward-reflecting mirrors 90 and 91.

The mirror pivot control circuit 94 pivots both of the upward-reflecting mirrors 90 and 91 in the present preferred embodiment. However, the present invention is not limited to this configuration, and it is acceptable to fix the upward-reflecting mirror 90 at a predetermined angle and to perform pivot control of only the upward-reflecting mirror 91 having a high possibility of collision.

Fifth Preferred Embodiment

Figure 22:
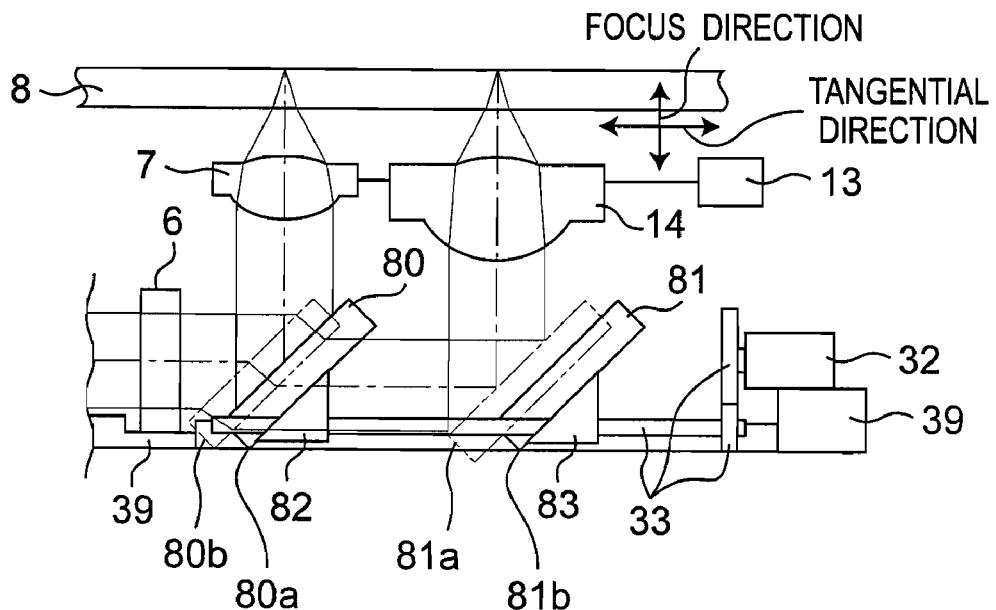
FIG. 22 is a schematic view of an optical system showing an essential part of an optical head device according to a fifth preferred embodiment of the present invention.

FIG. 22 is a schematic view of an optical system showing an essential part of an optical head device according to the fifth preferred embodiment. Referring to FIG. 22, the optical head device of the present preferred embodiment differs from the optical head device of the first preferred embodiment shown in FIGS. 1 to 10 in that two upward-reflecting mirrors 80 and 81 are provided in place of the upward-reflecting mirror 30. The optical head device of the present preferred embodiment is similar to the optical head device of the first preferred embodiment in other respects, and no detailed description is provided for the components denoted by the same reference numerals.

Referring to FIG. 22, the upward-reflecting mirror 80 is retained by a retention member 82, and the upward-reflecting mirror 81 is retained by a retention member 83. The retention members 82 and 83 retain the upward-reflecting mirrors 80 and 81 at a predetermined interval so that the upward-reflecting mirror 81 is located at a position 81b not to oppose the objective lens 14 when the upward-reflecting mirror 80 is located at a position 80a to not oppose the objective lens 7 and so that the upward-reflecting mirror 80 is located at a position 80b to not oppose the objective lens 7 when the upward-reflecting mirror 81 is located at a position 81a to oppose the objective lens 14 and are moved mutually interlockingly in the tangential direction by the driving force 32 and the moving mechanism 33. A relation of a distance DT between the upward-reflecting mirror 80 and the upward-reflecting mirror 81 to a distance DL between the center of the objective lens 7 and the center of the objective lens 14 can be expressed by the following Equation (3):

$$DT > DL \qquad (3).$$

In a case where laser light having a wavelength of 405 nm is used, the retention members 82 and 83 are moved so that the upward-reflecting mirror 81 is located at the position 81a to oppose the objective lens 14, and the upward-reflecting mirror 80 is located at the position 80b where they are displaced leftward by a distance offset from the position 80a to oppose the objective lens 7 of FIG. 22. The positions of the upward-reflecting mirrors in this case are indicated by two-dot chain lines in FIG. 22. The laser light having a wavelength of 405 nm outputted from the semiconductor laser 9 (See FIG. 2) is transmitted through the upward-reflecting mirror 80 and thereafter reflected by the upward-reflecting mirror 81 to have its direction changed. The laser light reflected by the upward-reflecting mirror 81 is condensed by the objective lens 14, and this leads to formation of a light spot on the information recording medium 8. Since the thickness of the objective lens 14 is larger than the thickness of the objective lens 7, the distance between the upward-reflecting mirror 80 and the objective lens 7 is larger than the distance between the upward-reflecting mirror 81 and the objective lens 14. Therefore, by setting the distance of offset of the upward-reflecting mirror 80 within a range in which the upward-reflecting mirror 80 does not collide with the objective lens 7, the collision of the upward-reflecting mirror 80 with the objective lens 7 can be avoided.

On the other hand, when laser light having a wavelength of 650 nm is used, the retention members 82 and 83 are moved so that the upward-reflecting mirror 80 is located at the position 80a to oppose the objective lens 7, and the upward-reflecting mirror 81 is located at the position 81b where they are displaced rightward by a distance offset from the position 81a in which it opposes the objective lens 14 of FIG. 22. The positions of the upward-reflecting mirrors in this case are indicated by solid lines in FIG. 22. The laser light having a wavelength of 650 nm outputted from the semiconductor laser 1 (See FIG. 2) is reflected by the upward-reflecting mirror 80 to have its direction changed. The laser light reflected by the upward-reflecting mirror 80 is condensed by the objective lens 7, and this leads to formation of a light spot on the information recording medium 8. Since the upward-reflecting mirror 81 has been displaced rightward from the position 81a to oppose the objective lens 14, the upward-reflecting mirror 81 does not collide with the objective lens 14.

As described above, since the upward-reflecting mirrors 80 and 81 are provided offset in the optical head device that has the two upward-reflecting mirrors 80 and 81, the collision of the objective lens 14 with the upward-reflecting mirror 81 when the objective lens 7 is used can be prevented. With this arrangement, the total height of the optical head device can be reduced, and a compact thin optical head device, a disc recording apparatus, a disc reproducing apparatus and a disc recording and reproducing apparatus can be provided.

Sixth Preferred Embodiment

Figure 23:
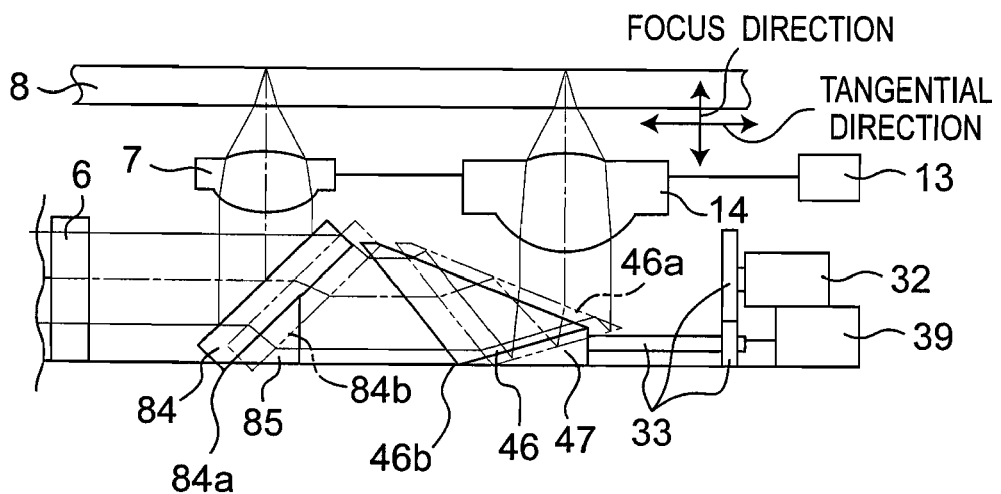
FIG. 23 is a schematic view of an optical system showing an essential part of an optical head device according to a sixth preferred embodiment of the present invention.

FIG. 23 is a schematic view of an optical system showing an essential part of an optical head device according to the sixth preferred embodiment. Referring to FIG. 23, the optical head device of the present preferred embodiment differs from the optical head device of the first preferred embodiment shown in FIGS. 1 to 10 in that an upward-reflecting mirror 84 and a prism 46 are provided in place of the upward-reflecting mirror 30. The optical head device of the present preferred embodiment is similar to the optical head device of the first preferred embodiment in other respects, and no detailed description is provided for the components denoted by the same reference numerals.

Referring to FIG. 23, the upward-reflecting mirror 84 is retained by a retention member 85, and the prism 46 is retained by a retention member 47. The retention members 85 and 47 retain the upward-reflecting mirror 84 and the prism 46 at a predetermined interval so that the prism 46 is located at a position 46b not to oppose the objective lens 14 when the upward-reflecting mirror 84 is located at a position 84a to oppose the objective lens 7 and so that the upward-reflecting mirror 84 is located at a position 84b to not oppose the objective lens 7 when the prism 46 is located at a position 46a to oppose the objective lens 14 and are moved mutually interlockingly in the tangential direction by the driving force 32 and the moving mechanism 33.

In a case where laser light having a wavelength of 405 nm is used, the retention members 85 and 47 are moved so that the prism 46 is located at the position 46a to oppose the objective lens 14, and the upward-reflecting mirror 84 is located at the position 84b where they are displaced rightward by a distance offset from the position 84a opposing the objective lens 7 of FIG. 23. The positions of the upward-reflecting mirror 84 and the prism 46 in this case are indicated by two-dot chain lines in FIG. 23. The laser light having a wavelength of 405 nm outputted from the semiconductor laser 9 (See FIG. 2) is transmitted through the upward-reflecting mirror 84 and thereafter reflected by the prism 46 to have its direction changed. The laser light reflected by the prism 46 is condensed by the objective lens 14, and this leads to formation of a light spot on the information recording medium 8. Since the upward-reflecting mirror 84 has moved to a position displaced rightward from the position opposing the objective lens 7 even if the objective lens 14 is lowered in the focus direction, the upward-reflecting mirror 84 does not collide with the objective lens 7.

On the other hand, when laser light having a wavelength of 650 nm is used, the retention members 85 and 47 are moved so that the upward-reflecting mirror 84 is located at the position 84*a* to oppose the objective lens 7, and the prism 46 is located at the position 46*b* where they are displaced leftward by a distance offset from the position 46*a* opposing the objective lens 14 of FIG. 23. The positions of the upward-reflecting mirror 84 and the prism 46 in this case are indicated by solid lines in FIG. 23. The laser light having a wavelength of 650 nm outputted from the semiconductor laser 1 (See FIG. 2) is reflected by the upward-reflecting mirror 84 to have its direction changed. The laser light reflected by the upward-reflecting mirror 84 is condensed by the objective lens 7, and this leads to formation of a light spot on the information recording medium 8. Since the prism 46 has been displaced leftward from the position 46*a* to oppose the objective lens 14, the prism 46 does not collide with the objective lens 14.

As described above, according to the optical head device of the present preferred embodiment, by providing the upward-reflecting mirror 84 and the prism 46 offset, a compact thin optical head device, a disc recording apparatus, a disc reproducing apparatus and a disc recording and reproducing apparatus can be provided without increasing the height of the optical head device.

In the present preferred embodiment, the optical head device has two objective lenses and one upward-reflecting mirror 84 and one prism 46, which opposes the objective lenses. However, the present invention is not limited to this, and the optical head device may be provided with three or more objective lenses, two or more upward-reflecting mirrors and one prism. In such case, the prism needs to be placed in correspondence with the objective lens located farthest from the light source since the prism is structurally unable to give transmitted light to the other upward-reflecting mirror.

Although the lights of two wavelengths are made incident from one direction of the upward-reflecting mirror 30 as shown in, for example, FIG. 1 in the above preferred embodiments, the present invention is not limited to this, and the optical system may be constituted so that lights of two wavelengths (light of one wavelength may have a plurality of wavelengths) are made incident from both the rightward and leftward directions of the upward-reflecting mirror 30.

Although the quarter-wave plate 6 is provided not just below the objective lens 7 (or 14) as shown in, for example, FIG. 1 in the above preferred embodiments, the present invention is not limited to this, and it may be provided just below the objective lens 7 (or 14).

Although both of the two upward-reflecting mirrors 80 and 81 move when, for example, the two upward-reflecting mirrors 80 and 81 are provided as shown in, for example, FIG. 22 in the above preferred embodiments, the present invention is not limited to this, and it is acceptable to provide a configuration such that at least one upward-reflecting mirror moves.

Although the optical head device is mounted in the disc recording and reproducing apparatus in the first to sixth preferred embodiments, the present invention is not limited to this, and the head apparatus may be mounted in a disc recording apparatus that records an information signal on a disc-shaped information recording medium or a disc reproducing apparatus that reproduces an information signal from a disc-shaped information recording medium instead of the disc recording and reproducing apparatus.

According to the optical head device of the present invention as well as the disc recording apparatus, the disc reproducing apparatus, and the disc recording and reproducing apparatus each provided with the same optical device, the moving mechanism for moving the luminous flux direction changing means is provided, and therefore, a compact thin optical head device as well as a disc recording apparatus, a disc reproducing apparatus, and a disc recording and reproducing apparatus each provided with the same optical device can be provided. The optical head device of the present invention and the disc recording apparatus, the disc reproducing apparatus, and the disc recording and reproducing apparatus each provided with the same optical device can be utilized for a disc recording and reproducing apparatus that records information on a disc-shaped information medium of, for example, a CD, a DVD, a BD, an HD-DVD or the like and reproduces information from the information recording medium.

The invention claimed is:

1. An optical head device comprising:
   a plurality of luminous flux direction changing units for receiving an incident luminous flux having a predetermined wavelength emitted from a light source, and changing a direction thereof;
   a plurality of objective lenses having mutually different numerical apertures, each of which condense the luminous flux whose direction has been changed by one of the luminous flux direction changing units, and radiating a condensed luminous flux onto an information recording medium;
   a first moving unit for moving the objective lenses in a focus direction of the information recording medium so that the luminous flux incident on the information recording medium becomes in a focused state; and
   a second moving unit for moving at least one of the luminous flux direction changing units so that the luminous flux is incident on the information recording medium via any one of the plurality of objective lenses;
   wherein, when the luminous flux is incident on the information recording medium via an objective lens having the minimum numerical aperture among the plurality of objective lenses, the luminous flux direction changing units are offset to positions to not oppose any objective lens having the maximum numerical aperture among the plurality of objective lenses;
   wherein a retention member retains the plurality of luminous flux direction changing units at a predetermined mutual interval so that at least one of the plurality of luminous flux direction changing units is provided at a position to oppose the corresponding objective lens having the minimum numerical aperture, and at least another one of the plurality of luminous flux direction changing units is provided offset at a position to not oppose any corresponding objective lens having the maximum numerical aperture; and
   wherein the second moving unit moves at least one of the luminous flux direction changing units by moving the retention member in one or more dimensions so that the at least one of the plurality of luminous flux direction changing units opposes the corresponding objective lens having the minimum numerical aperture.

* * * * *